US006947959B1

(12) United States Patent
Gill

(10) Patent No.: US 6,947,959 B1
(45) Date of Patent: Sep. 20, 2005

(54) DIGITAL MEDIA ASSET MANAGEMENT SYSTEM AND PROCESS

(75) Inventor: Timothy Gill, Denver, CO (US)

(73) Assignee: Quark, Inc., Denver, CO (US)

( * ) Notice: Subject to any disclaimer, the term of this patent is extended or adjusted under 35 U.S.C. 154(b) by 0 days.

(21) Appl. No.: 09/259,947

(22) Filed: Mar. 1, 1999

Related U.S. Application Data

(63) Continuation-in-part of application No. 08/891,612, filed on Jul. 14, 1997, now Pat. No. 6,005,560, which is a continuation-in-part of application No. 08/375,163, filed on Jan. 18, 1995, now Pat. No. 6,052,514, which is a continuation-in-part of application No. 07/955,312, filed on Oct. 1, 1992, now abandoned.

(51) Int. Cl.[7] ............................ G06F 15/00; G06F 17/30
(52) U.S. Cl. ............................... 707/501; 707/3; 707/4; 707/5; 345/302
(58) Field of Search .................. 707/1–10, 102–206, 707/500–526, 530; 714/100; 35/326

(56) References Cited

U.S. PATENT DOCUMENTS 5,813,014 A * 9/1998 Gustman .................... 707/103
6,005,560 A * 12/1999 Gill et al. .................... 345/302
6,052,514 A * 4/2000 Gill et al. .................... 707/500
6,097,389 A * 8/2000 Morris et al. ................ 345/346

* cited by examiner

*Primary Examiner*—Hosain T. Alam
*Assistant Examiner*—Alford W. Kindred
(74) *Attorney, Agent, or Firm*—Webb & Lewis LLC; Glenn L. Webb

(57) ABSTRACT

An application for managing digital assets regardless of type or format. The application allows assets to be check-in, either on an individual asset basis or on a group basis, and check-out. Information regarding assets is stored in a database to enable searching for the assets without searching the assets themselves. The user is provided features for organizing assets retrieved in accordance with supplied criteria and for performing actions on assets in a batch mode. Digital assets are retrieved from the storage servers by queries. The query results are displayed in a user-customizable Query Palette. User Views are provided to group references or icons representing selected assets to organize the references to the assets without affecting the organization of the assets themselves. Methods and processes are applied to optimize asset management across a distributed architecture by monitoring and balancing the load and usage of the server and the storage entities.

94 Claims, 11 Drawing Sheets

DIGITAL MEDIA ASSET MANAGEMENT SYSTEM AND PROCESS

CROSS REFERENCE TO RELATED APPLICATIONS

This application is a continuation-in-part of U.S. patent application Ser. No. 08/891,612 (U.S. Pat. No. 6,005,560), filed on Jul. 14, 1997, titled Multi-Media Project Management and Control System, which is a continuation-in-part of U.S. patent application Ser. No. 08/375,163 (U.S. Pat. No. 6,052,504), filed Jan. 18, 1995, which is a continuation of U.S. patent application Ser. No. 07/955,312, filed Oct. 1, 1992 now abandoned, and titled Distributed Publication System with Simultaneous Separate Access to Publication Data and Publication Status Information. These applications are incorporated herein by reference.

FIELD OF THE INVENTION

This invention relates to the field of applications for the management of digital assets.

BACKGROUND OF THE INVENTION

The management of digital content is an increasing concern in all areas of the preparation of digital content for presentation, and particularly in the electronic publishing industry. The explosive growth of electronic publishing, including both print and multi-media applications, along with the availability of numerous types of media has created extensive problems in the management of the digital content created for these publications.

This content can be expensive to create or acquire. There also may be legal titles and copyrights involved in the individual digital content which must be accounted for as well. Thus, the reusability of digital content is an important concern in electronic publishing.

This digital content, often referred to as "assets", may be in numerous different forms, such as text files, graphic files, audio files, video files, executable files, such as multimedia presentations, and many other types. Also, within each type of file (text, graphic, etc.), the file may even be in different formats, such as a graphic file could be in JPEG, TIFF, BMP, or many other formats. The management of the multitude of differing file types is an important need in the growing cross-media publishing industry where documents are being created for the print industry, the Internet and other multi-media presentations.

The ability to manage digital assets has become critical, not only in the electronic publishing industry, but in other document management operations, such as within company operations including human resources, legal, accounting departments. The electronic publishing industry in particular, has critical concerns with the management of digital assets used in creating the content for multi-media publications, including print, multi-media recordings, Web documents, not only for Internet use but for Intranet and other networked environments, and other types of multi-media presentations. Once the digital asset is created, it is necessary for that asset to be securely stored and indexed in a fashion that allows it to be easily retrieved. The asset also must be maintained to ensure that any revisions to the asset are only done in an authorized manner.

Organizations, particularly in the publishing industry, are often geographically separated. There may be offices needing to pool resources that are separated by great distances. The transfer of resources between these offices frequently create many problems in tracking the digital assets.

A number of applications have attempted to address some of these issues. Examples of these systems include MediaSphere from Cascade, Inc., Cumulus from Canto Software and Media Vault from EDS. These systems fail to adequately frilly address the issues discussed above.

For example, these applications do not support specific content-related functionality. Such content-related features include the ability to generate low-resolution thumbnail images from high-resolution data, to easily elaborate different multimedia objects generated in different computer formats or to manage individually stored digital content in a single multimedia document. Computer formats to be supported by an asset management technology should be those commonly used by users, such as Microsoft Word, the QuarkXPress or the QuarkCopyDesk file formats.

The prior applications also do not allow the user to customize the search queries for digital assets stored within the system. Also, these prior applications do not allow the user to customize the display of the results of the search queries in order to optimize the search routines. The prior applications fail to create and maintain relationships between assets which have been checked into the operations of the application. These applications also fail to organize the assets and their attributes in manner that allows optimum use of the assets.

The prior applications fail to provide a distributed architecture to balance the load and usage of the digital assets between different locations in an efficient and optimal manner. The prior applications fail to allow for local storage of the assets at high-usage locations while still maintaining central control of the assets and their use. The prior applications also fail to provide the capability to automate many of the tasks necessary to organize the assets.

There presently is a need for an application that can efficiently and comprehensive manage these digital assets.

SUMMARY OF THE INVENTION

The present invention accomplishes these needs and others by providing a system apparatus, methods and processes for managing digital assets. The present invention, in a preferred embodiment, allows users to receive, catalogue, store, retrieve, and archive digital assets, such as multimedia objects and documents, by means of advanced communication and processing computer technologies.

Different types, as well as different classes, of digital content are able to be checked-in and checked-out of the present invention without altering the type or class of the asset containing the digital content. The digital assets are stored in a database or in file servers or other storage entities, such as OPI (Open Prepress Interface) or HSM (Hierarchical Storage Management) systems. Headers containing information about the assets, referred to as "metadata", are stored in a data-base. The metadata information is used to organize, locate, and retrieve each digital asset from among the many other digital assets stored in the file servers or in the database. The present invention enables highly customizable header fields (or attributes) to provide powerful features for the organization, search and retrieval of the digital assets.

During the check-in process, the main server application gathers certain metadata information about the digital asset, such as file type, file size, creation date, modification date, last user, and other information about the file. The user can add other metadata information about the asset, such as keywords, description, user identification, and other metadata individually or in combination to organize the asset for the search for and retrieval of digital content. The present invention provides unique processes to the database repositories and the asset metadata to speed up and facilitate the tasks of organizing, locating, manipulating, and updating multimedia asset.

The digital assets, during or prior to checking-in, can be displayed in a hierarchical structure to show the relationships between the assets. The relationships between digital assets are used to define individual items as digital assets as well as creating groups of items as digital assets. The relationships between the digital assets also are used to define asset classes. Asset classes, in the present invention, are groups of defined header fields relating to the digital assets and the attributes of the digital assets. Asset classes relate to each other by class inheritance and attributes are inherited from the parent to the child classes. Users can retrieve and catalogue digital assets by selecting a single resource or by searching for the related asset classes.

Digital assets can be retrieved from the storage servers by formulating queries. The queries set forth criteria that the system uses to search the headers in the database regarding the information relating to the stored assets or by searching the full file of the digital asset, such as full-text search. Searches for digital assets that have been checked-in can be based on numerous criteria, such as file type, file creator, last revision date, or even the last person to check a file in or out, that is contained in the headers stored in the database or in a full search of the digital assets stored in the file servers or in the database. The results of these searches can be displayed in a hierarchical graphic display, in tables, in thumbnails, in header view formats, as single resources or in groups of assets.

The present invention displays the results of such a search in a Query Palette which allows the user to view and organize the results. The results of the search can be displayed in tables, as thumbnails, previews or in header views as desired. The user can thus select among the list of assets which fall under the search criteria in order to check out desired assets. The present invention provides a highly customizable capability for organizing and displaying the results of searches.

The present invention also provides User Views to group references or icons representing selected assets in order to organize the references to the assets without affecting the organization of the stored assets. These grouping of references can be shared for collaborative projects or for repetitive tasks.

Another feature of the User Views is the use of "action folders". This feature allows scripted actions to be applied to assets at scheduled times. Actions such as checking in assets, applying metadata, converting assets from one format to another and archiving assets can be applied to a number of assets by simply dragging and dropping assets onto an action folder. Action folders produce automatic execution of pre-defined scripts on the items (assets and files) included in the folder. The script process is iteratively executed through all items contained into the action folder. The actions may be scheduled for a single occurrence or for periodic occurrences.

The present invention uses unique processes for managing a distributed architecture in order to optimize the performance across a network by monitoring and balancing the load and usage of the server and the storage entities. The present invention may even be accessed over the Internet through Servlets.

The present invention can be accessed by using the client components, as defined in details below, or by external applications, such as QuarkXPress and QuarkCopyDesk from Quark Inc., or Word from Microsoft Corporation, by means of XTensions or "connect modules".

These and other features are set forth in the detailed description of a preferred embodiment and in the drawings.

BRIEF DESCRIPTION OF THE DRAWINGS

FIG. 12 is a screenshot of a Query Palette in plain mode under a preferred embodiment of the present invention.

FIG. 13 is a screenshot of a Query Palette in hierarchical mode under a preferred embodiment of the present invention.

DETAILED DESCRIPTION OF A PREFERRED EMBODIMENT

The present invention provides a system apparatus, methods and processes for managing digital content. It is to be expressly understood that the exemplary description that is discussed herein is for descriptive purposes only and is not meant to limit the scope of the inventive concept. Other implementations of the inventive concept are considered to be within the scope of the appended claims.

The term digital content refers to the work of writers, page layout artists, graphic designers, business development professionals, digital audio and video producers, marketing communications specialists, and other creators of content which can be processed by digital computers and/or stored electronically. Digital content may include any electronically storable information, such as text, graphics, audio, video, animation, document layout geometry, executable computer programs, such as multimedia publications, or a collection of files or objects together. The pieces of digital content that are used as material for publishing and are actually stored are referred to as "digital assets".

Overview of the System

The preferred implementation of the present invention is configured as an object oriented client server architecture based on the Object Management Group's (OMG's) Common Object Request Broker Architecture (CORBA) specification. By using CORBA the client and server components of the present invention can communicate with each other regardless of which programming languages they are written in, which platforms they are running on, and which machine they are physically located. This specific implementation is intended for explanatory purposes only and is not meant to limit the present invention to this implementation. Other implementations including other architecture and/or standards, now existing or as developed are considered within the scope of the claimed inventions.

Figure 1:
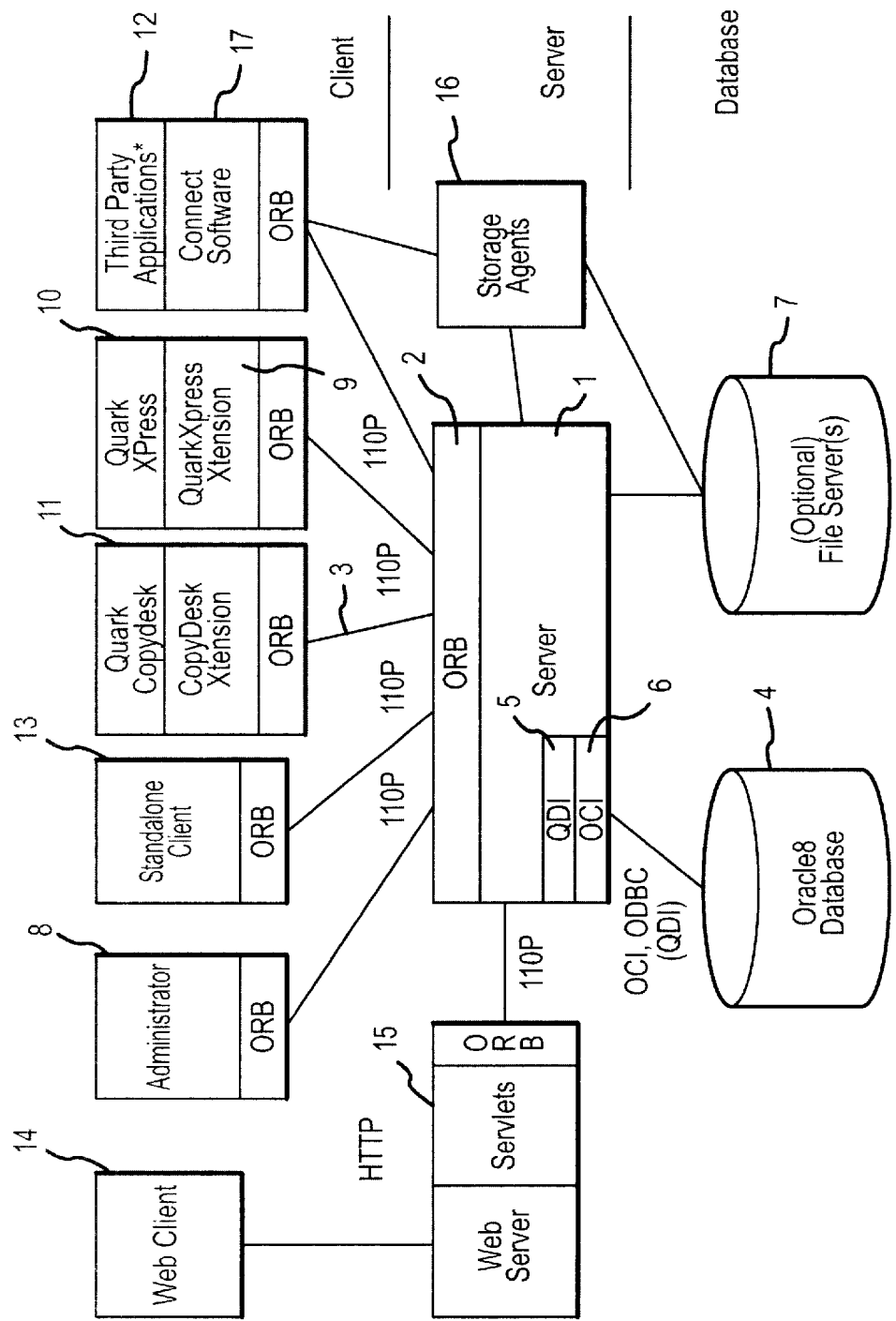
FIG. 1 is an overview of a preferred embodiment of the present invention.

The client-server architecture of the present invention is based on a threelayer structure: a database/storage layer, where the the digital assets representing pictures, sounds, text and other media data and the metadata that describe them reside; a server layer, from which assets are controlled and managed; and a client/interface layer, where users interact with assets by such actions as organizing, checking in, searching, and checking out. The client layer can communicate with the database/storage layer only through the server layer, thus ensuring that the server maintains control over all assets tracked by the present invention. The client server architecture of the present invention allows the communication between several client and servers components located over different hardware and software platforms with a centralized database or file server. Interfaces between client and the server components are specified, in this descriptive embodiment, using the IDL (Interface Definition Language), which provides a standardized, platform-independent software environment. The client server architecture of the present invention is depicted in FIG. 1. Communications between the Server 1 and client components are managed through ORBs 2 (Object request Brokers). An ORB 2 is a software component that enables communication between different CORBA-compliant objects. Other interfaces, components and environments are also within the scope of the claimed inventions.

The communications between the clients and the server 1 are processed by the present invention as follows: the client sends its request to an ORB 2, then the ORB 2 connects the server and returns the results to the clients. The protocol used for client/server communication is the open IIOP 3 (Internet Inter-ORB Protocol). The IIOP 3 enables different ORBs 2 to transfer various kinds of data, including digital assets, between the server 1 and the clients over a network. The adopted IIOP 3 technology enables the present invention to work as a distributed application and to operate over a physical network supporting the TCP/IP (Transmission Control Protocol/Internet Protocol). Other protocols are also considered within the scope of the claimed invention. IIOP 3 and TCP/IP are provided herein for descriptive purposes.

The communication between the server 1 and the database 4 which can be installed on a different machine located over the network is realized through a portable proprietor layer, the Quark Data Interface 5 (QDI) component. The QDI component is used to interface the server with the databases through their native interface protocols, such as the Oracle Call Interface 6 (OCI) or the ODBC (Open Database Connectivity).

The main modules for each layer of the present architecture are explained below.

The Database/Storage Layer

In the preferred embodiment of the present invention, the Database/Storage layer includes the Database 4 (repository) and the File Servers components 7.

Database

The Database 4 is the physical memory storage where assets are stored. The Database 4, in the descriptive preferred embodiment, is directly connected with the Server 1 component through the Quark Data Interface 5 (QDI)) library. The Database 4, in the preferred embodiment, is a commercially available, industry-standard database, such as the Oracle 8 or Microsoft SQL server databases. Other databases are also within the scope of the present invention. The Database 4 is preferably a scalable database to accommodate data of differing sizes.

File Server

The File Server 7 is an optional physical storage entity that provides additional memory space for large digital assets. The decision on which asset classes to store in the Database 4 and which asset classes to store in the File Server 7 can be made through Storage Rules, discussed below.

The File Server 7 can be a single stand-alone file server or a cluster of file servers which act as a single logical unit in order to balance the loads on different file servers. Also, a plurality of file servers can be networked together at one or more sites. The number of assets to be managed by the present invention is limited only by the capability of the Database 4 and the File Server 7 storage capacity.

The File Server 7 may also include an archive site (either on-line or off-line) where digital assets which are not in frequent use may be stored in order to free up storage space on the file servers. The stored digital assets may be compressed when archived to further conserve storage space. One important feature of the preferred embodiment is the continued maintenance of the metadata for the archived digital assets in the Database 4. This allows ease of retrieval of the archived digital assets. If the archive site is located off-line, the application stores the assets to be archived, track requests for archived assets and retrieve the requested assets.

The present invention can be combined with OPI (Open Prepress interface) servers. OPI software (Open Prepress Interface) allows to reduce network traffic by working with low resolution preview files of pictures for editing the layout. High resolution files are used only for printing. The present invention communicates with the OPI server through special folders. When a picture is checked in, the server puts it in the High resolution folder of the OPI server. The OPI server creates a preview (low resolution) picture and puts it into the preview folder, where the server can get it.

The Server Layer

In the preferred embodiment of the present invention, the Server Layer includes the main Server 1 application.

Main Server Application

The main Server 1 application, or simply the Server, is the link between the Client applications and the Database Payer where assets are stored. It handles all requests made for assets and serves as multi-purpose interface for different types of databases. The Server 1 is used to store asset data in the Database 4 and in the File Servers 7. The Server 1 is based on a standard relational database. All server interfaces with other components are realized in IDL, the CORBAs Interface Definition Language, in the preferred descriptive embodiment. Other languages may be used as well.

The Server 1 runs on the server computer and moves assets into and out the Database 4. It tracks the current status and location of all media asset, and controls access to the Database 4 via user names, passwords, and privileges. All assets are controlled by the Server 1 so that it can maintain the integrity of the Database 4 content. The Server 1 has no user interface; to configure it, users must use the Administrator component 8 of the Client layer. The Server 1 includes an Object Request Broker (ORB) component 2: the ORB 2 enables communication between the Server 1 and the Client components. It is also used to expand the architecture by communicating with QuarkXPress XTensions modules 9 or other application modules.

The main Server 1 application performs the cataloguing, storage, indexing and tracking of the digital assets. It not only stores the digital assets in the Database 4 and/or File Servers 7, but also creates and stores information about the digital assets in the Database 4. The information about the digital assets, referred to as "metadata", is critical in managing the digital assets. The Server 1 gathers, organizes and stores the metadata in a manner to create an efficient process for storing and searching for this information about the digital assets.

The metadata about each of the digital assets, in the preferred embodiment, is gathered in two processes. The first process is performed automatically by the Server 1 itself. The Server 1 automatically gathers information and generates the corresponding metadata on such information as file type, size, dates of creation and modification, versions, and file-type-specific information such as image resolution and word counts. Other information may be automatically generated by the Server 1 as well. The Server 1 gathers defined information that must be gathered as well as user definable information. The server administrator can configure the Server 1 to gather additional information if desired.

The second process of gathering the metadata is entered by the user. The user-supplied metadata may include such information as the identity of the user, the status of the asset, category of the asset, keywords to be applied to the asset, a text description of the asset or other information. The Server 1 can be configured to require such information to be entered by the user before the digital asset can be checked in.

The metadata is stored by the Server 1 in headers in the Database 4 which are referenced to a particular digital asset. The headers, with the relevant metadata, are stored in the Database 4 with the digital asset stored either in the Database 4 or on a file server 7, depending on the type of digital asset and on the Storage Rules. A header is made up of separate information "slots" called "header fields". Different kinds of assets have different qualities, such as a text file having a word count and a graphic file having a resolution. Thus, different types of assets will possess different information for their metadata, and require different header fields. For example, a header for a text file may have universal header fields for the identity of the user who created the file, the status of the asset, the last date of modification, and file specific header fields for the word count, program which created the text file and for the page count of the text file. A header for a graphic file may have the same universal header fields, but different file specific header fields for the resolution and type of graphic.

Each header field in a header has a unique name and is designed to contain a specific kind of metadata. For example, an asset might have a header field named "Creation Date," another named "File Type," and another named "Created By." Each header field can contain only a specific type of information, such as a date, or a number, or a string of text. The following system-generated header fields, in the descriptive preferred embodiment, are applied to all digital assets checked-in to the system.

| Field | Type | Notes |
| --- | --- | --- |
| Asset Name | Text | Taken from file name. |
| Type | Selection | For example: PICT, QuickTime movie, QuarkXPress document. |
| Class | Text | Asset class. |
| Size | Number | File size, plus dimensions and resolution (if applicable). |
| Modification Date | Date | Date of most recent check-in or revision. |
| Modified by | Number ID | Number of user. |
| Header Modification Date | Date | Date of most recent change. |
| Header Modified by | Number | ID number of user. |
| Asset Creation Date | Date | Date when asset was created. |
| Asset Created by | Number ID | ID number of user. |
| Creator Application | Selection | If available. |
| Creation Platform | Selection | Mac OS or Windows. |
| File Modification Date | Date | Date asset when file was last modified. |
| File Creation Date | Date | Date asset when file was created. |
| Index Status | Selection | "None" or "To be indexed". |
| Copyright | Text | If this information can be extracted from the file. |

The present invention deals with headers to help users label, locate, and view information about assets tracked by the Database 4 component. The present invention provides the capability for users to define and customize the headers. When users define headers, there are several attributes that can be defined. Users may define the type of data the field will contain, how the field is formatted and what the default measurement system is; whether or not the field has minimum and maximum values and, if so, what those values are. Users may also set whether users are required to enter data in the field and whether or not the value entered in that field has to be unique. Server administrators can also create customized header fields for specific users or jobs. Access to header fields is regulated by "privileges". Privileges determine which users have what level of access to which assets and features. The present invention implements privileges in terms of users, roles, groups, and access control lists. A user is a logon name and a corresponding password that are registered with the Server. A role is a set of privileges that determines which assets a user can access and which commands they can use. For example, privileges for a role called "Image-Editing Technician" might allow check-in and check-out of picture files but prevent check-in or check-out of QuarkXPress layouts. An "Editor" role might allow full access to all text files, but prevent anything but read-only access to picture files. To grant the appropriate privileges to the appropriate people, all an administrator needs to do is apply the "Image-Editing Technician" and "Editor" roles to the appropriate users. A group is simply a named list of users. Access control lists are sets of access privileges specific to a particular asset. Access control lists determine which users and groups may have what kind of access to that asset.

Figure 21:
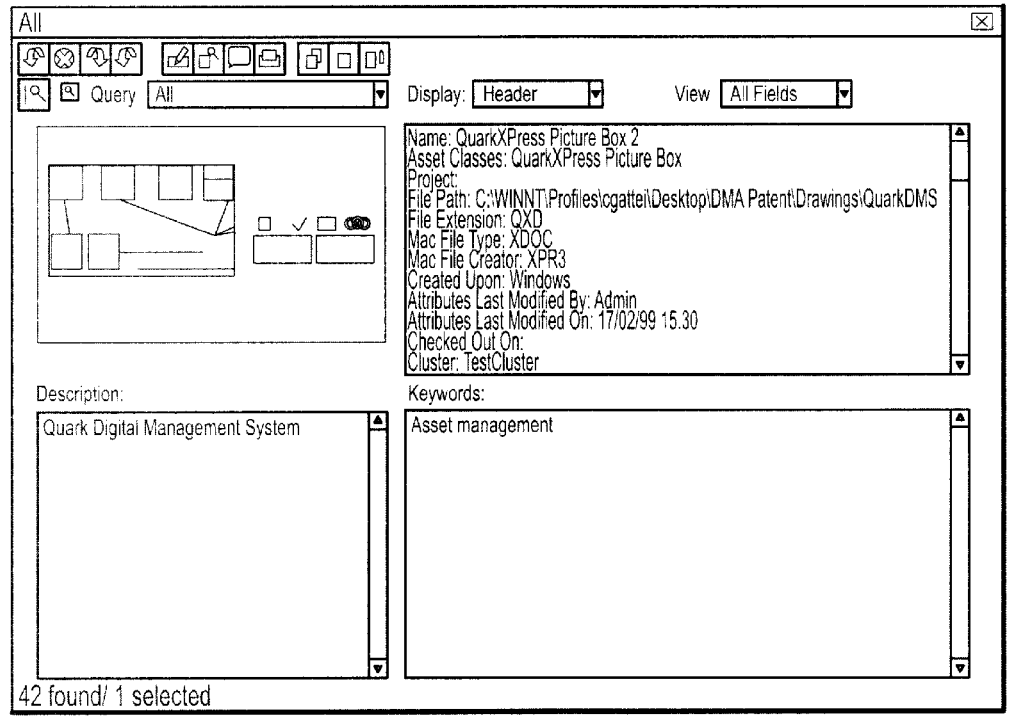
FIG. 21 is a screenshot of a sample header view including all header fields.

Header fields are also used to manage the display of the content of a digital asset. Header fields can be displayed in different ways using different header views. Header views or masks are "templates" that arrange the display of the data in a header. Each header view shows a certain selection of header fields, arranged in a particular layout. The present invention lets users to create separate, customized header views for different kinds of assets. A sample of header view is depicted in FIG. 21.

For example, the present invention lets users create different header views that lists copyright-related header fields near the top of the scroll list, and another header view that shows only header fields relating to resolution and size. Each user can then choose the header view that works best for them as the default header view for the each asset class. Header views let users control the way headers appear for different asset classes when users check-in files.

Digital assets can also contain other assets. An asset that does not contain other assets is a "simple asset". An asset that contains or refers to other assets is called "container" or "complex asset", e.g. a QuarkXPress document which is composed by text sections, picture boxes, logos, etc. Examples of simple assets include: text content and picture content. Examples of complex assets include: books, documents, groups, text items, picture items, and other graphic items. Container assets refer to or contain other assets. If an object is represented as a container asset, it is possible to extract and administer the components as individual single resources or in group as a single asset.

The digital assets are divided into asset classes or types of assets, such as text files, graphic, video, animation, etc. An asset class, in the preferred embodiment, is a named group of header fields. Each asset is assigned to a particular asset class. That particular asset class determines which header fields are available for the asset. This feature eliminates the need of unnecessary header fields for the assets, and minimizes database storage as well as increasing efficiency in checking in and retrieving assets from the system.

Asset Hierarchy

The preferred embodiment of the present invention organizes the asset classes 18 into a hierarchy 19 (level-based relationship) wherein asset classes can "contain" other asset classes. The phrase "contain" refers to a hierarchical association between the asset classes. A upper level asset class may have another asset level assigned to it. An asset class is able to "inherit" the header fields of another asset class to which it is assigned.

Asset types inherit header fields from the asset classes that contain them as well as having header fields defined for them. Similarly, an asset class that is contained by another asset class inherits header fields layouts from its enclosing asset class. The asset class hierarchy is set up to make it easier to add new asset classes and types. For example, when an user needs a series of new asset classes that share most (but not all) of the same header fields, organized in more-or-less the same way, he or she can first create a "master" asset class, configure that asset class with all header fields that are shared by all the asset types within that class, and build a header field layout that will work for all types of that asset. Then, he or she can add new asset classes inside the main asset class. Because these new asset classes would inherit the configuration of the main class, the present invention automatically is able to associate the header fields of the main class to all new sub-classes.

Figure 2:
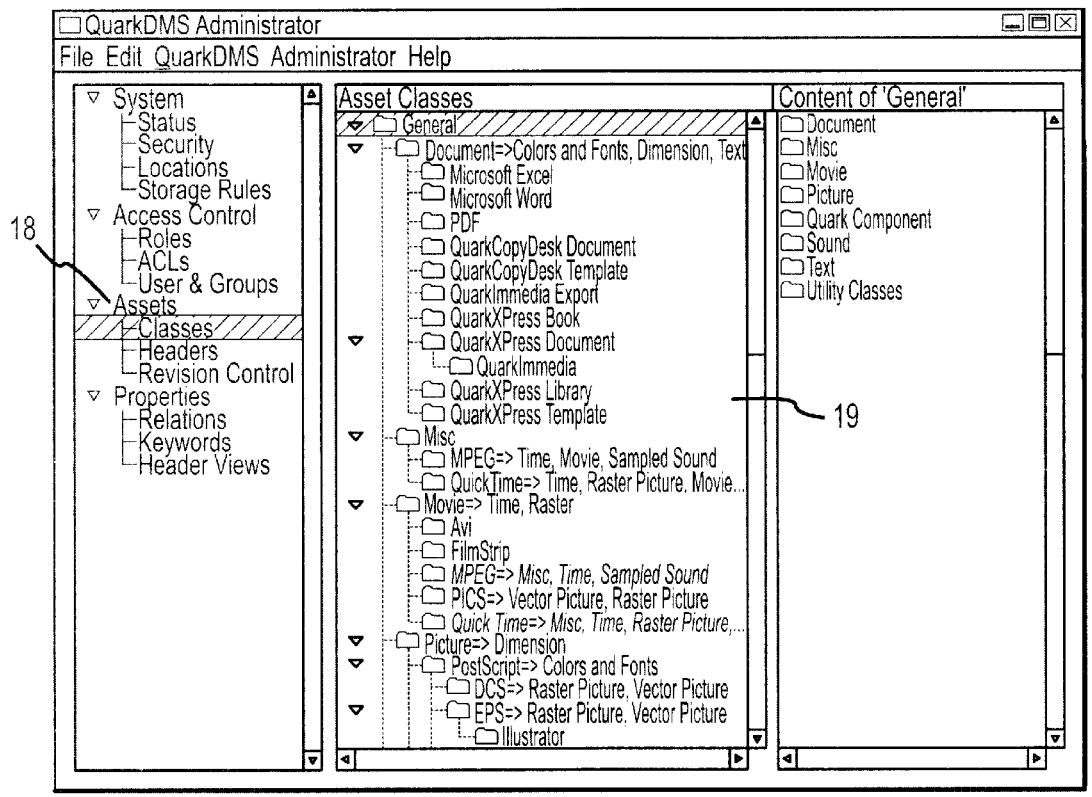
FIG. 2 is a screenshot of a display of an hierarchical asset class structure of a preferred embodiment of the present invention.

An example of a hierarchical asset class is illustrated in FIG. 2. The root level class, named General, may have a set of header fields defined to it. A series of secondary asset classes are assigned to it, including Document asset class, Misc asset class, Movie asset class, Picture asset class, Quark Component asset class, Sound asset class, Text asset class, and Utility classes asset class. Each of the secondary asset classes not only have particular header fields which relate to specific information concerning that particular asset class, but they also inherit all of the header fields that have been defined for the General asset class. Thus, the Picture asset class not only includes all of the header fields that have been defined for that particular asset class, but also inherits all of the header fields that had been defined for the General class. Similarly, the Document asset class 20, shown in FIG. 3, which is contained by the General asset class, includes the header fields which have defined for that asset class. The hierarchical progression can be further continued for the Microsoft Word asset class inheriting header fields defined for the Document asset class, and the General asset class.

Another feature of the asset class hierarchy in the preferred embodiment is the ability for an asset class to appear in more than one place in the hierarchy. In such instances, the asset class can inherit all of the header fields of both sets of parent classes (multiple inheritance).

A system administrator using the Administrator 8 can specify which file name extension, creator code/file type, and icon that a particular type of asset should have when the asset is checked out to a client program. This information assists the present invention in determining which application should be used to open and edit the asset.

In the Database structure, the asset hierarchy is implemented by using a "contains" relation. This allows having as many levels of the hierarchy in the Database 4 as the user needs and plans to manage. Other relations, such as "was published in the same article", between assets can be defined using the Administrator 8 component. A relation is a description of the relationship between two or more assets. There are three steps to define a relation. First, a relation should have a descriptive name. The name helps users understand what type of relation it is and how it should be used. Second, users need to define whether the relation is transitive or intransitive. And third, users need to define the direction of the relation. Relations can be either symmetrical (the relation works the same way in either direction) or asymmetrical (the relation works differently forward or backward). For asymmetrical relations users can define a name for the backward direction. A symmetric relation is the same regardless of which asset is listed first. An asymmetric relation changes depending on which asset is listed first.

Figure 3:
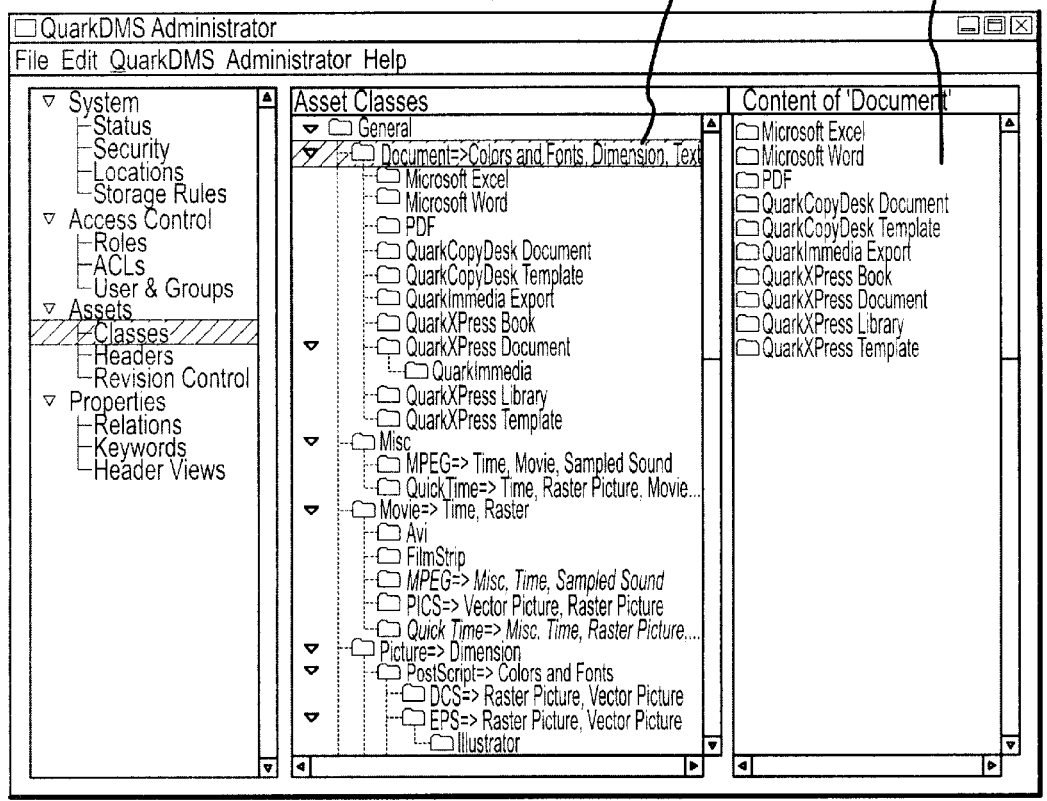
FIG. 3 is a screenshot of a more detailed hierarchical structure of the embodiment of FIG. 2.
Figure 4:
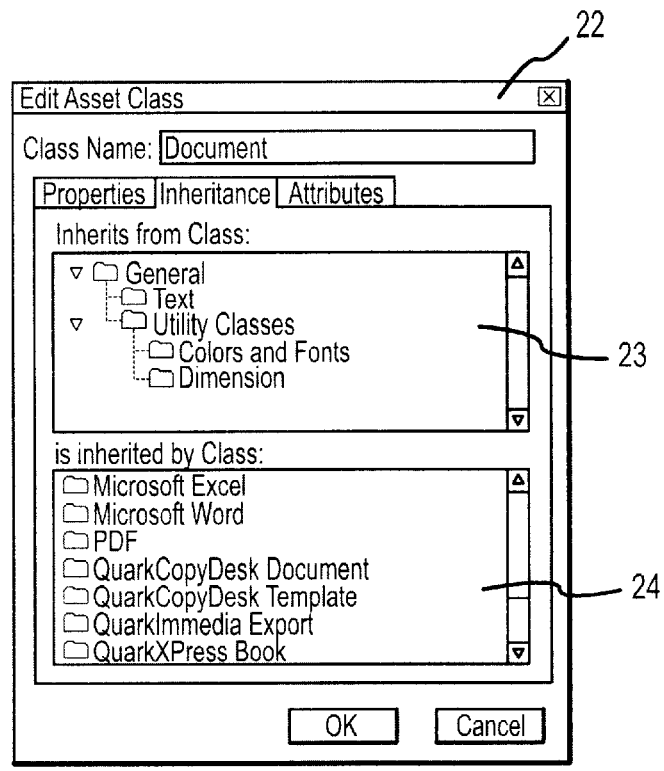
FIG. 4 is a dialog box of an asset class inheritance of the embodiment of FIG. 2.

The preferred embodiment of the present invention also allows information about the inheritance and attributes of a particular asset class to be viewed and edited. A particular asset class, as shown in FIG. 3, is selected which causes the Edit Asset Class 22, shown in FIG. 4 to appear. If information regarding the header fields that the selected asset class has inherited from other asset classes or from which other asset classes inherits from the selected asset class is desired, then the Inheritance menu is selected. In the example shown in FIG. 4, the Document asset class inherits 23 the header fields from the General asset class, the Text asset class, the Colors and Fonts asset class and the Dimensions asset class.

Also, these header fields, as well as the header fields which may have been defined for the Document asset class are in turn inherited 24 by the Microsoft Excel asset class, the Microsoft Word asset class, the PDF asset class, the QuarkCopyDesk Document asset class, the QuarkCopyDesk Template asset class, the QuarkImmedia Export asset class, the QuarkXPress Book asset class, the QuarkXPress Document asset class, the QuarkXPress Library asset class and the QuarkXPress Template asset class.

Figure 5:
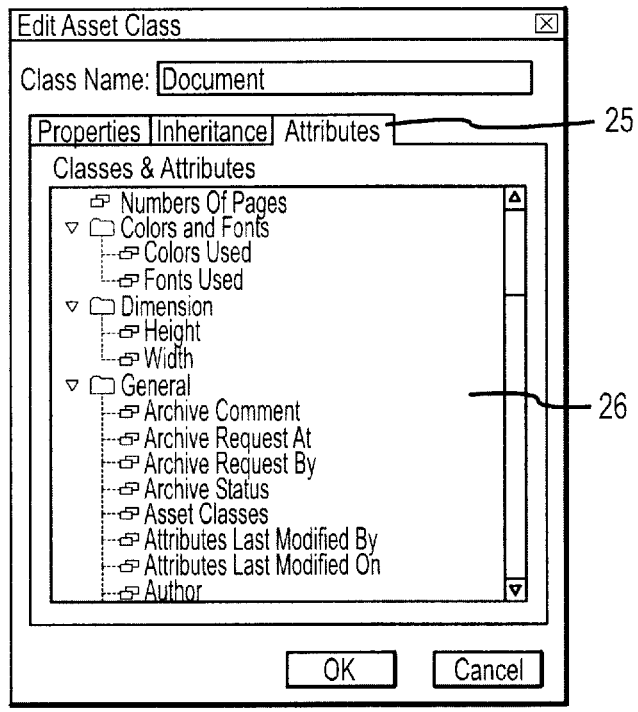
FIG. 5 is a dialog box of the attributes of an asset class structure of the embodiment of FIG. 2.

The user can also review the individual header fields for each of these asset classes. The Attributes menu 25 is selected from the Edit Asset Class menu shown in FIG. 4. The Classes & Attributes 26 for the selected asset class is displayed, as shown in FIG. 5. A listing of all of the classes from which the selected asset class inherits header fields is displayed, with the header fields defined for each of those classes.

The invention in the preferred embodiment, has a system-defined hierarchy of asset classes. It also allows the administrator to define new asset classes by means of the Administrator component 8. User-defined asset classes may be moved around in the hierarchy by "cut and paste" and "drag and drop" operations.

The user, in the preferred embodiment, is able to create a new asset class either at the root level of the asset class hierarchy or within an existing asset class. If a new asset class is desired at the root level of the asset class hierarchy, then the existing asset classes are deselected. If a new asset class is desired inside an existing asset class, then the existing asset class is selected. Once the location of the new class has been selected, then the Edit & New Class menu is selected. A new asset class icon is added at the specified position in the hierarchy. The new class will inherit all of the header fields assigned to all of the asset classes that contain it in the hierarchy, if any.

The present invention allows new header fields to be added to new and existing asset classes. Administrators can create customized header fields for specific users or jobs using the Edit & New Header Fields menu command. Header fields can include strings, with maximal length which is a database-dependent feature, full searchable text, a date with optional range, a number with optional range, a measurement with unit and optional range, a "domain", that is an enumeration or selection of a finite set of possible values, and a set of values of one primitive field type (set of text, set of date, set of number, set of domain). If a new header field is added to an asset class that contains other asset classes, the header field is available for all assets in both classes.

Figure 6:
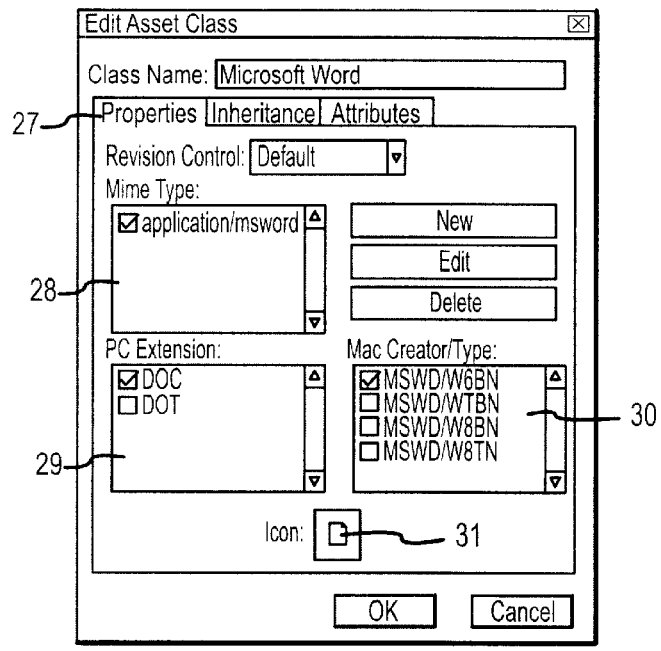
FIG. 6 is a dialog box of the properties of the asset class structure of the embodiment of FIG. 2.

Properties 27 of an asset class may also be associated with that asset class as well, by selecting the Properties tab as show in FIG. 6. These properties, in the preferred embodiment, include the Mime Type 28 (Multipurpose Internet Mail Extension), PC (Windows) Extensions 29, to specify which file name suffixes may be associated with assets of this type, Mac Creator/Type 30 which may be associated with assets of this type on a Mac OS computer; and an icon 31 to be associated with assets on this type.

The administrator may also decide to copy a particular asset class to a different asset class while keeping the original asset class in its current location. The asset class is selected from the main Administrator dialog box of FIG. 3, and the Classes menu is selected from the Asset Classes panels scroll list. The Edit & Copy function menu is then selected. The asset class into which the asset class to be copied is then selected from the asset class list and the Edit & Paste function menu is selected. The copied asset class is thus copied into the selected asset class.

The administrator may also decide to delete or move (without copying) an asset class. The asset class is selected from the asset class list and the Edit & Delete menu or the Edit & Cut menu is chosen. If the selected asset class has been applied to one or more assets, then the administrator must select a replacement asset class to be applied to those assets. If a selected asset class contains other asset classes, then those asset classes are moved to the new location recursively.

Other implementations of the inventive concept is considered to be within the scope of the present invention. The above description is intended for explanatory purposes of the invention only.

The Client/Interface Layer

In the preferred embodiment of the present invention, the Client/Interface Layer includes the Administrator 8 component, the Standalone Client 13 application, the QuarkXPress XTension 9 and the Connect modules 17. This layer, is intended for descriptive purposes only and is not meant to limit the scope of the present invention. Other components, applications, extensions and modules may also be used under the present invention as well.

The Administrator component 8 is the central tool used to configure privileges and user groups, create reports, and perform administrative tasks over the Server 1 component. It lets system administrators to log on into Server 1 over a network from a client machine. Once logged on, administrators can configure privileges and access control lists (ACLs), add and delete users and groups, specify user access to assets, add new Asset Classes, update relations and the keyword hierarchy, control header fields and header views and perform all other administrative tasks without having to restart the server. Privileges defined through the Administrator 8 component control the access to the server functionality. Access to digital assets is controlled by the ACLs. The Administrator 8 component also gives the user all basic client features of the Standalone Client 13 application.

The Standalone Client 13 application is used by the user to perform queries over the Server 1 component, to retrieve, check-out, and check-in multimedia objects registered in the Database 4 repository without a specific host application, such as QuarkXPress, Microsoft Word, etc.

The Quark XTensions components 9 allow users to access the Server 1 from the QuarkXPress application 10, and use tracked digital assets. The QuarkXPress XTensions modules 9 are used as a bridge between the product-specific XTensions interface and the CORBA/IDL compatible Server interface. They also allow users to "deconstruct" QuarkXPress documents, storing individual QuarkXPress items and groups in the database for cataloging and reuse. It is to be understood that other extension modules may also be used as well for other applications.

The Connect modules 17 are used to connect some existing commercial applications from other vendors, such as Photoshop, PageMill, Illustrator, by Adobe, Inc., FrontPage, Word by Microsoft Corporation or other electronic publishing programs, etc., to the Server component 1, and use tracked digital assets within them. For example, the Coruect module 17 lets users check an image file into or out of a server from within a compatible image-editing application. The Connect module 17 integrates the present invention with programs that can create and modify a wide variety of media types, including word processing documents, spreadsheets, and graphics.

The present invention is not intended to be limited to the described programs or types of programs. Other programs, types of programs and interfaces are considered to be within the scope of the present inventive concept.

Client Applications

Each client of the preferred embodiment of the present invention includes a core set of features as well as possible additional features unique to each client component. The core set of features includes the ability to check in assets, find assets within the Database 4 and the File Systems 7, retrieve the assets, use the assets and check the assets back in after use or revisions. The core set of features also allows relations between the assets to be assigned to keep track of relationships between assets. These features are discussed in greater detail below.

Check-In

The preferred embodiment of the present invention through the client program allows the user to "check in" an asset, that is, assign control of the asset to the Server. Once the control of the asset has been assumed, it can only be accessed through the Client application of the present invention. This is accomplished by storing the metadata about that asset in the Database 4 and storing the asset in either the Database 4 or in the File Servers 7. The check in process can be used to check-in a new asset (add asset) or to perform a check-in of a new asset version of a checked out asset. When an asset is checked in, the present invention automatically saves a new version of the asset. All versions of that assets are called revisions. A revision is saved each time an asset is checked into the present invention. The invention allows users to specify how revisions of files are maintained by using the Revision Control panel.

Often in publishing industry, publishers require to reuse asset data, including not only pictures, but picture boxes containing all related formatting information like scaling, skew, background color, box shape, etc. Additionally, sometimes there is the need to reuse some more complicated arrangement of several boxes, for example some artwork or a company logo. The present invention has the ability to check in a single asset or to group related assets together as a single asset. This unique feature enables an user to manage a group of assets which are applied together in a single use and even "deconstruct" the items within an active document into individual assets. An example of this may be a document which contains several items such as text files and/or graphic files. The individual text files may be checked in as individual assets as well as the individual graphic files. Also, one or more of the text files may be grouped with one or more related graphic files and the combination may be saved as an asset.

Figure 9:
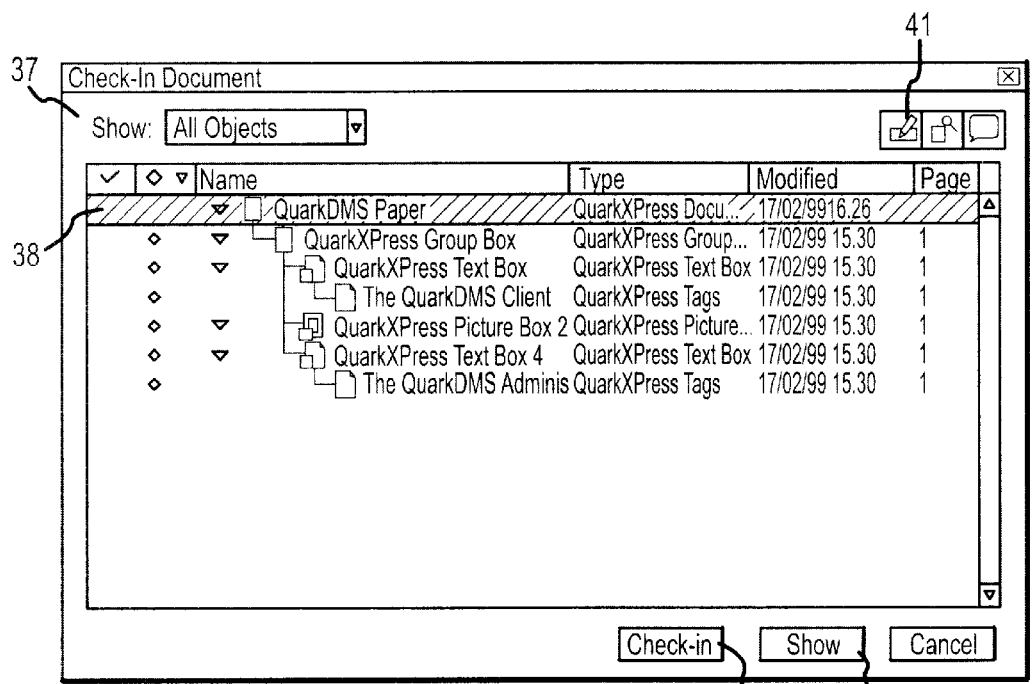
FIG. 9 is a screenshot of a dialog box showing the Check-In status of a document under a preferred embodiment of the present invention.

Another unique feature of the present invention is the ability to establish relationships between the individual assets and between groups of assets. The user selects the items from an active document (or other work product) that is desired to be managed by the system. A Check-In Document dialog box 37, such as the dialog box shown in FIG. 9, displays the items in an active document in the client program (such as a document in QuarkXPress). The relationship between the items and groups is displayed in a logical hierarchical structure. In this example, a document, the "QuarkDMS Paper" 38 is at the root level directory. The paper contains a QuarkXPress Group Box. The QuarkXPress Group Box further contains two Text Boxes and a Picture Box. This hierarchical relationship between each of these items is thus established.

The assets, in the preferred embodiment of the present invention, can be checked in as individual assets, as groups of assets, or as multiple groups. The present invention allows a document to be checked in as a single document or else deconstruct it in order to check some or all of its items as separate assets. The deconstructing functionality is achieved by means of software modules to be installed within the external application. For the QuarkXPress application 10, this software consists in QuarkXPress XTensions modules 9. The user, from the document program in use, as for example a QuarkXPress document, which consists in a multimedia document composed by a collection of images, text and other media content, activates a dialog box, such as the dialog box shown in FIG. 9. The dialog box displays the items which make up the document and the relationships between the items. The dialog box also displays the Asset Status for each of the items, that is the check-out status for each of the items, the type of item, and other information such as the size of the file, the last date of modification and the physical location of the item within the document. Other information could be displayed as well as desired.

The Asset Status (first column) for each of the items will display whether the item is currently checked out by the user, whether the item is currently checked out by another user, whether the item is available on a read-only basis, or whether the item has not yet been checked in and is not under the control of the system. Different icons will represent the different status of the items.

The user can determine whether each item is to be checked in individually, as a part of a group or both, that is a copy checked in as part of a group while the original is checked in as an individual asset. The Check In column (third column) displays the status of each item and whether it has been selected for checking in as an individual asset, as part of a group or both. Different icons will be displayed regarding the status of the item or group. The check in status for each item or group of item can be selected or changed by simply clicking in the Check-In column adjacent the item or group until the desired status is displayed by an appropriate icon.

If a group of assets are to be checked in as a group, then a name is assigned to the group, and the relationship of the items within the group is established. For example, the document in FIG. 9 includes a group named QuarkXPress Group Box which includes the individual items, QuarkXPress Text Box and QuarkXPress Picture Box. The item type is displayed as QuarkXPress Group Box.

The user can also determine the physical location of each item or group within the document (if the document and items are of a type which allows this operation) either by the information displayed in the dialog box, or by selecting the Show button 39. The document will be then displayed at the location of the selected item.

Each of the assets are assigned a name, either by the user or by a default mechanism. The present invention also determines the file type (such as text, picture, or a group), the size of the asset, the last modification date and the location of the asset within the document or other work product. The user will also be prompted for information about the asset, such as the identity of the creator, text description of the asset, keywords about the asset, and other defined fields of information. This information about the asset, or metadata, is stored in a header in the database along with the location of storage of the asset itself.

The metadata for an asset can be viewed or edited by selecting the name of the item in the dialog box, and then selecting the Edit Header button 41. The user supplied metadata can be edited, if desired and if this information has not been locked out, that is access-denied, by others or if this asset is not currently checked out by others.

Once the assets have been selected and their check-in status chosen, the user selects the Check In button 40. In the event that the user attempts to check in two assets that contain the same content, such as two picture boxes into which the same picture file has been imported, the present invention will check in both picture boxes but only check in one copy of the picture file with both checked-in picture boxes referencing the checked-in version of the picture file. If an identical picture file has already been checked in as a picture asset in the system, the invention will display an alert notifying the user of this existing asset, and allow the user to use the existing asset or check in the copy as an asset.

This is important not only for space saving but more importantly for ensuring that the same version of the picture file is used. For instance, the picture file may be updated or revised at some point.

Once the check-in status for each of the items and groups has been established, the user selects the Check-In 40 button to check the items and/or groups as assets. This can be done either on a single item/group basis or on a multiple item/group basis. The system may also prompt the user for required information about the asset, if that information has not yet been supplied.

One example of the above features is the use of QuarkXPress 10 as a client program (as well as the QuarkCopyDesk application 11). The XTension 9 component installed into the QuarkXPress 10 client application is used to assign attributes and keywords to media assets selected to be stored as single resources. When checked in, the media assets contained in the document is sent to the Server 1 component. When text asset is received the Server 1 component starts indexing process of the text in order to assure full text search over the stored asset. For QuarkXPress documents all text boxes are indexed. The XTension modules 9 further create previews for every page and a thumbnail picture of the first page of the document. When managing text files, the XTension 9 components generate a QuarkXPress tags file as text preview, and a text box containing the first characters of the document as thumbnail asset. Once the check in of the asset has been accepted, the assets are under the control of the system.

The descriptive examples of the inventive concepts set forth above are not intended to unduly limit the scope of the claimed inventions. Other techniques for entering the assets into the control of the system and for processing any kind of document represented with different asset classes in the system are considered to be within the scope of the present inventive concept.

Queries

In order to use digital assets that are under the control of the present invention, the user must be able to efficiently retrieve the digital assets. The present invention, in the preferred embodiment, provides a process to search, retrieve and use these digital assets. The search process, referred to as a "query", is a request for a list of all assets that meet specific criteria. Once this list is generated, then the user must be able to determine if the desired digital assets are on this list. The user should also be able to organize this list for efficient use. The preferred embodiment of the present invention utilizes a "query palette" 42 to present the list of digital assets that meet the user's criteria in a manner that allows the user to efficiently use this list. It is to be expressly understood that other search techniques are used under the present invention. For example, the present invention is also able to search and retrieve stored assets by full file searches of the digital asset, such as full text search of text files.

The queries generated by the present invention are efficiently processed by searching the metadata of the assets. The present invention performs also full text and keyword search over index and data stored in the server 1. Since the metadata is stored in headers in the Database 4, the application does not have to search through the voluminous file server storage for the information it seeks. The digital assets are not retrieved from the file servers 7 until the user has reviewed the metadata for the digital assets, determined which digital assets are required, and then checks the chosen digital assets out. The transactions in the Database 4 are more efficiently processed in this manner.

In the preferred embodiment, the present invention forms queries from three segments of information. It is to be expressly understood that other formulations of queries could also be used under the present invention. The query of this embodiment includes an operand, an operator and a parameter. The operand selects the header fields to be searched. For example, the header fields discussed above may include the date created, the file size, the date of last modification, the type of file, the identity of the creator, etc. The operator describes the kind of search to be performed in that header field. For example, the operator could designate that the search be a certain parameter, not be a certain parameter, be within a range of parameters etc. The parameter describes the data to be searched within the header field. A typical query could be for all assets entered into the system on a particular date. The formulated query would be:

| Operand | Operator | Parameter |
|---------|----------|-----------|
| Asset Class | Is | QuarkXPress Document |

Figure 10:
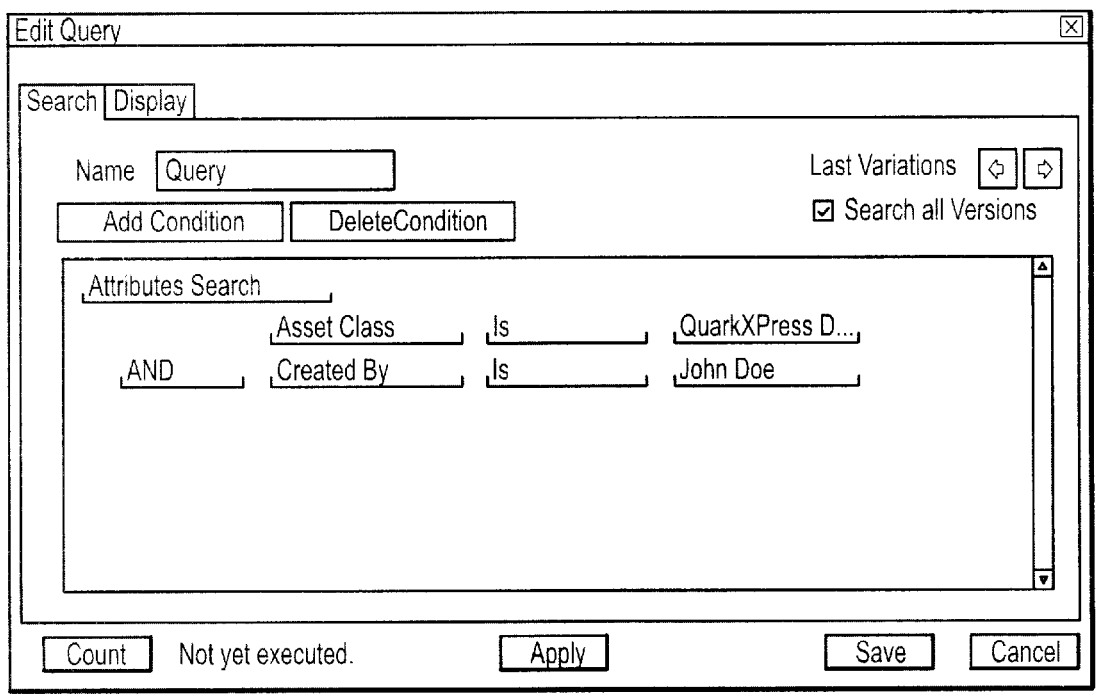
FIG. 10 is a screenshot of a dialog box showing a sample query of a preferred embodiment of the present invention.

This query would be entered into a dialog box, such as the dialog box illustrated in FIG. 10. The system then searches in the Database 4 for all header fields titled "Asset Class" for the metadata QuarkXPress Document. A query such as the one described above is referred to as a "Single Condition Query". The query may also have multiple conditions. A multiple condition query would include two or more queries linked by a "joining condition". A joining condition establishes the relationship between the two queries. It specifies whether the user is searching for the information jointly or in the alternative. For instance, if a user is searching for all QuarkXPress Document created by a user named "John Doe", the query would contain the multiple conditions:

| Operand | Operator | Parameter |
|---------|----------|-----------|
| Asset Class | Is | QuarkXPress Document |
| Joining condition | | |
| AND | | |
| Created by | Is | John Doe |

If the user was searching for all QuarkXPress Documents and any digital assets created by John Doe on any date, then the query would contain the multiple conditions:

| Operand | Operator | Parameter |
|---------|----------|-----------|
| Asset Class | Is | QuarkXPress Document |
| Joining condition | | |
| OR | | |
| Created by | Is | John Doe |

The second example would normally generate a much larger list of digital assets.

The present invention is thus able to search and retrieve a list of digital assets which meet criteria set by the user by searching the header fields in the database relating to the digital assets. The present invention also provides the capability to efficiently review this list in order to further select the desired digital assets. The present invention provides a feature referred to as "Accessories" which groups and sorts the list of digital assets in accordance with user specifications.

The Accessories features include a "Group By" accessory that lets the user specify how the list of returned assets will be displayed. The user specifies a header field, such as "Created By" or "File Type". The invention then displays the list of returned assets grouped by the information found in the specified header fields. For example, if a user specified that the list be grouped and displayed by the "File Types", then the invention would display the list of assets by the type of file, such as grouping all of the text files together, all of the graphic files together, etc.

The Accessories features also include a "Sort By" accessory that lets the user specify how the sequence of assets will be displayed. The user specifies a header field, such as "Created By" or "File Type". The invention then displays the list of returned assets sorted by the information found in the specified header fields. For example, if a user specified that the list be sorted and displayed by "File Name", then the invention would display the list of returned assets in sequence by their File Names.

A query for the above information, to be grouped by "File Type" and sorted by their "File Names" might be as follows:

| Operand | Operator | Parameter |
|---|---|---|
| Asset Classes | Is | QuarkXPress Document |
| | Joining condition OR | |
| Creator | Is | John Doe |
| Group By | File Type | |
| Sort By | File Name | |

Figure 11:
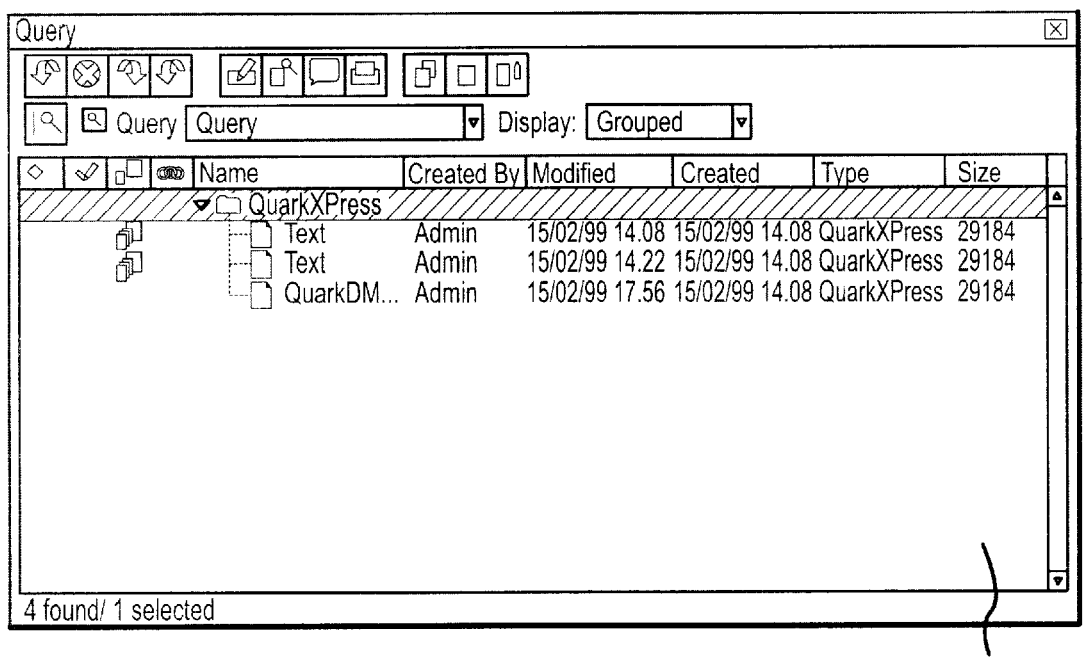
FIG. 11 is a screenshot of a Query Palette in Group mode showing the results of a query under a preferred embodiment of the present invention.

The result of a query is displayed in a "query palette" 42 as illustrated in FIG. 11, where assets are grouped by their respective type and information about "Created by", "Type", and "Size" are presented.

The preferred embodiment of the present invention also allows a user to save repetitive queries. For example, if a user often performs a query requesting the same criteria, the invention allows the user to "name" the query and save it. Named queries, in the preferred embodiment are saved on the Server 1, so that a user can access regardless of location. The user can specify that it only be available to particular users, or available to any user. Unnamed queries are stored on the local computer and discarded when the client session is finished.

The above descriptive embodiment of a query formulation is provided for explanatory purposes. Other query formulation techniques could be used as well under the present invention.

Query Palette

Figure 20:
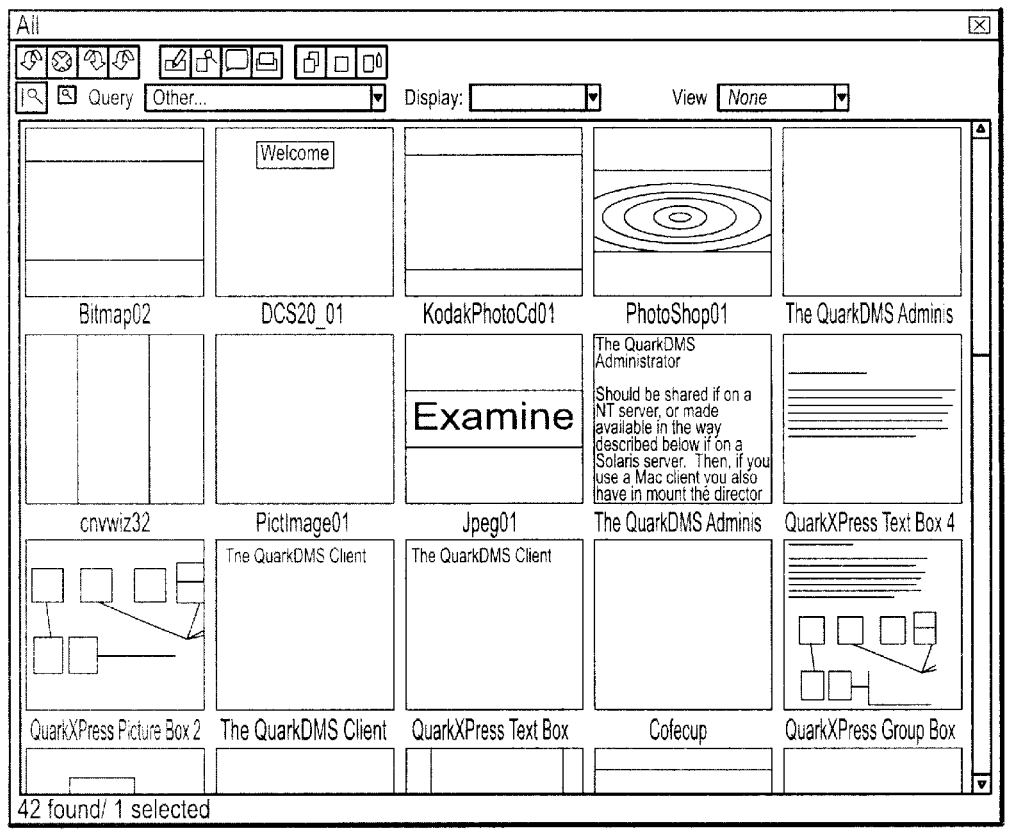
FIG. 20 is a screenshot of a dialog box for displaying the list of assets as thumbnails.

The preferred embodiment of the present invention also provides a "Query Palette" for the user to view and work with the results of queries before the digital assets are "checked-out". The Query Palette is a display of the list of retrieved assets. The Query Palette, in the preferred embodiment of the present invention. operates in the following modes: Plain, Grouped, Layout, Reverse Layout, Header, Userview.—The Plain— or query—mode 43 displays the list of assets returned by a query. The Grouped mode 42 is used to display asset grouped in folder according their respective asset class, as seen in FIG. 11. The Layout and Reverse Layout mode, 44 and 45, displays the relationships between assets and classes of assets. The Header mode displays assets by listing all header fields, as in FIG. 21, or by showing the low-resolution thumbnail for each asset, as in FIG. 20. Userview mode is explained in detail below. Additionally you have two browse modes: the Relation and the Revisions mode. The Relation mode displays all relations between assets. The Revisions mode 46 displays the revisions for each of those assets.

Figures 12, 13:
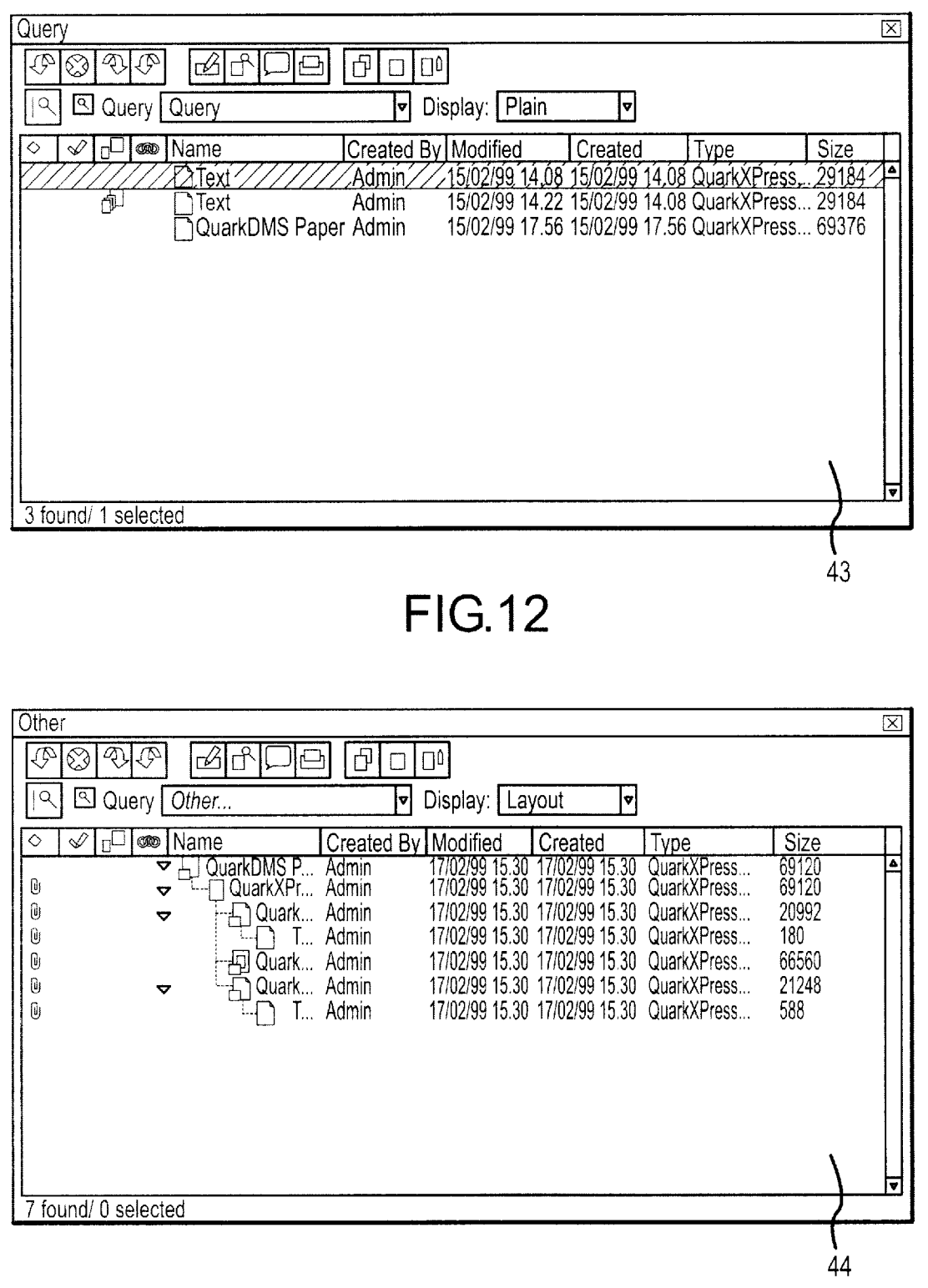

The query mode of the Query Palette 43, as shown in FIG. 12, displays a list of the assets which meet conditions of a query. This list of assets can be displayed in a table format, as thumbnails, as in FIG. 20, or as individual headers as in FIG. 21. If other assets are in the display which do not meet the current specified conditions, those assets are "grayed-out", to indicate that they do not meet the specified conditions.

An example of a Query Palette 44 in relation mode (layout) is shown in FIG. 13. The Query displays a document created in QuarkXPress. The document "contains" a group asset, and the group asset "contains" a picture asset and two text asset. When a document asset "contains", that is, have an association with other assets, such as text files, graphic files, etc., assets may be checked in as individual assets or as groups of assets. The Query Palette 44 in relation mode (layout) is able to display these assets and their relationships in a level-based graphic manner.

Figure 14:
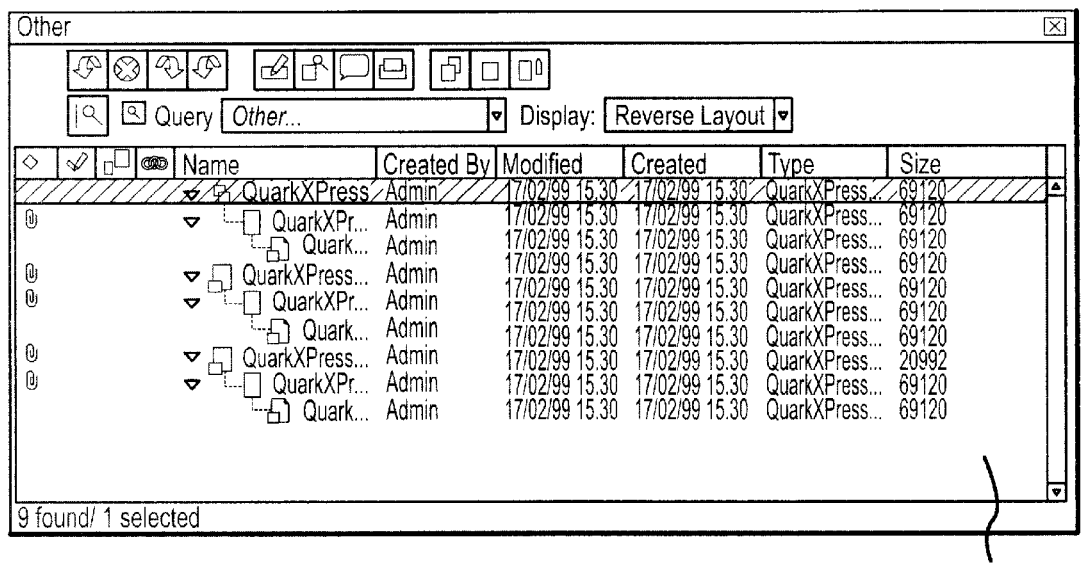
FIG. 14 is a screenshot of a Query Palette in reverse hierarchical mode under a preferred embodiment of the present invention.

The Query Palette 45 can also display these relationships in a "Reverse Layout" display, as shown in FIG. 14. In this display, the contained assets are displayed at the root level with any assets which contain it listed below it.

Figure 15:
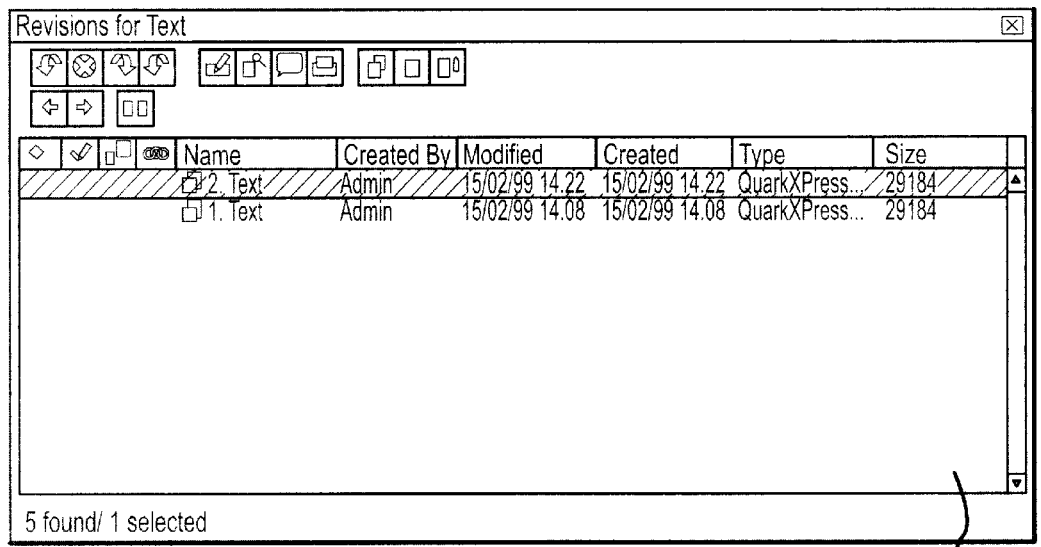
FIG. 15 is a screenshot of a Query mode in revision mode under a preferred embodiment of the present invention.

An example of a Query Palette 46 in revision mode is illustrated in FIG. 15. In revision mode, the Query palette 46 displays the list of revisions for each single asset. The Revisions column indicates whether the Server is tracking previous revisions for each asset. A blank space indicates that no revisions are stored for the asset. A document icon indicates that revisions are stored for the asset. Users may select this icon to see these revisions. When user selects the revision icon the list of revision items is displayed within the Query Palette.

Check-Out

The user can at any point select the assets for "Check-Out". Check-out of an asset means that the asset is copied to the local computer of the user. At that point, the user can use the asset, make copies of the asset, make revisions to the asset, establish relations for that asset, or any other operations. All other users can use the asset, make copy of it, establish relations for that asset but not modify it or create a new revision for that asset. No other user has access to check out an asset while it is checked-out. Once the asset has been check-out, however, it can be duplicated and distributed.

User Views

The preferred embodiment of the present invention provides other features to assist the user in organizing, manipulating and utilizing the assets managed by the system. One of these features is a "user view". A user view, in this embodiment, is a "work area" for the user to arrange and group assets. The user views also allow the user to view the results of queries and also to arrange for the automated processing of assets through "action folders", described below.

User views in the present invention are a grouping of "references" to the assets. Those references can be in the form of icons or aliases which provide a reference to a particular asset. The selection of a particular icon or other reference allows the stored asset to be "checked-out". The user views allow the user to select the references to specific assets for organizational purposes without changing the organization of the assets in the database or on the file servers.

An user view lets users move, copy, cut, paste, and delete icons without in any way affecting the assets they represent. By means of a user view, users can create User Folders, Action Folders, and Query Folders, to automate processes in a workflow, which are executed when open. Users can further move, copy and delete assets and folders contained in the user view. Unlike a file system, assets may have the same name, even if they are into the same folder. Folders at the same level of the hierarchy must have unique names.

User views can be configured by dragging and dropping assets into a User View Palette. These assets may be dragged from another user view or from a Query Palette. When users drag these assets to a user view, a pointer is added to the user view that leads to the original file, This is convenient when an asset is frequently used. User views contain User Folders, Query Folders and Action Folders. User Folders are basic folders that contain pointers to assets or other user folders. Query Folders include the list of items found by queries. Action Folders are a special type of User Folders.

Figure 16:
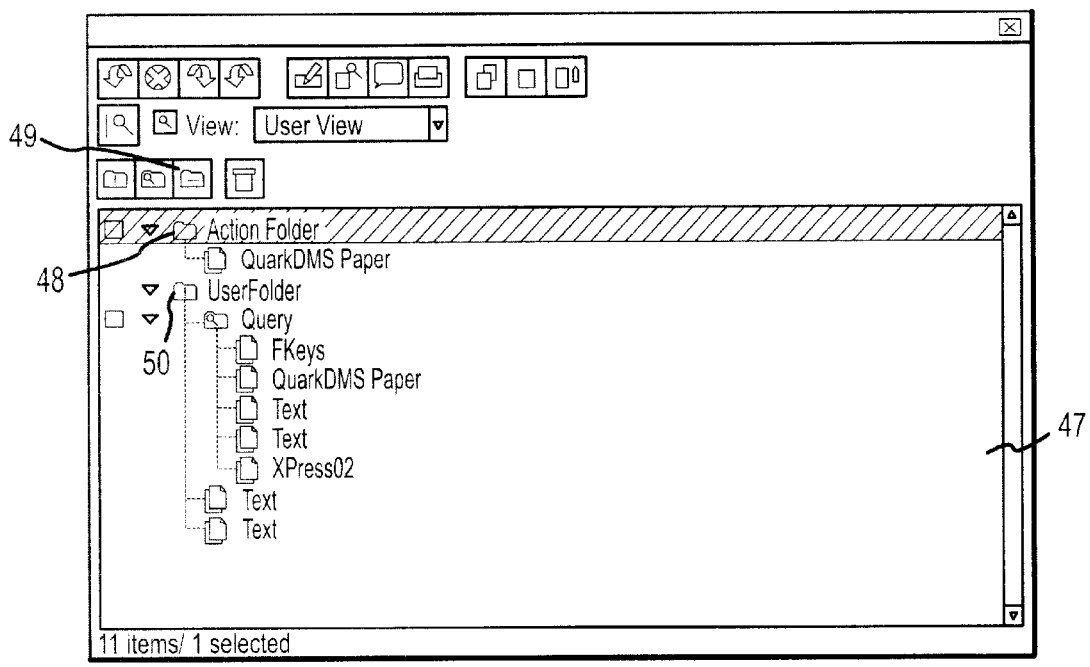
FIG. 16 is a screenshot of a User View and an Action Folder under a preferred embodiment of the present invention.

An example of a user view is illustrated in FIG. 16. Let us suppose an user, such as an image-editing technician, who is required to color correct a number of images that are being used in a variety of magazines within a publishing company. The only common relationship between these images is that the user must color correct them. There is no other relationship between these images or assets.

The user selects the "User View" option in the system. A dialog box 47, such as shown in FIG. 16, is opened. The user creates a new folder "User Folder" 50 in that dialog box. The user then creates a query, as described above, for all assets that meet the criteria for the images to be corrected. The results of the query are then "dragged" into the folder "User Folder" 50. A copy of the icon for each of those assets are copied into the folder. The query can then be closed. Each of the assets listed in the folder can then be checked-out, corrected and checked-in. The folder can be discarded, or else shared with other users. The user view allows the listing of assets to be organized without affecting the organization of the assets in any way.

The user views are stored on the server so that they can be accessed from any location. The access to the user views can be specified as read-only basis or on a read/write basis. The user views can be accessed simultaneously by other users as well, which is useful for collaborative projects.

Action Folders

The present invention also provides a useful feature for automating many aspects of the system management process. The present invention provides an "Action Folder" 48 feature to automate such aspects as applying header data to newly added assets. Each of the Action Folders has a corresponding script which determines the action to be applied to assets that are associated with the Action Folder. In the preferred embodiment of the present invention, the Action Folder feature can be accessed directly from the system through the Administrator or from the User View palette, discussed above.

Action Folders can be set to execute scripts immediately or at a scheduled time. Action Folders may additionally monitor file system folders, periodically or at a scheduled time. At that time the script is executed as if the media assets were put into an Action Folder of the User View. Warnings are issued to the client application through the network if the client component is terminated and a file system folder is to be monitored, or if the Action Folder script requires access to the local file system, or finally if it cannot carry out certain functions. All scripts related to an Action Folder run with the permissions of the owner of the Action Folder.

Figure 17:
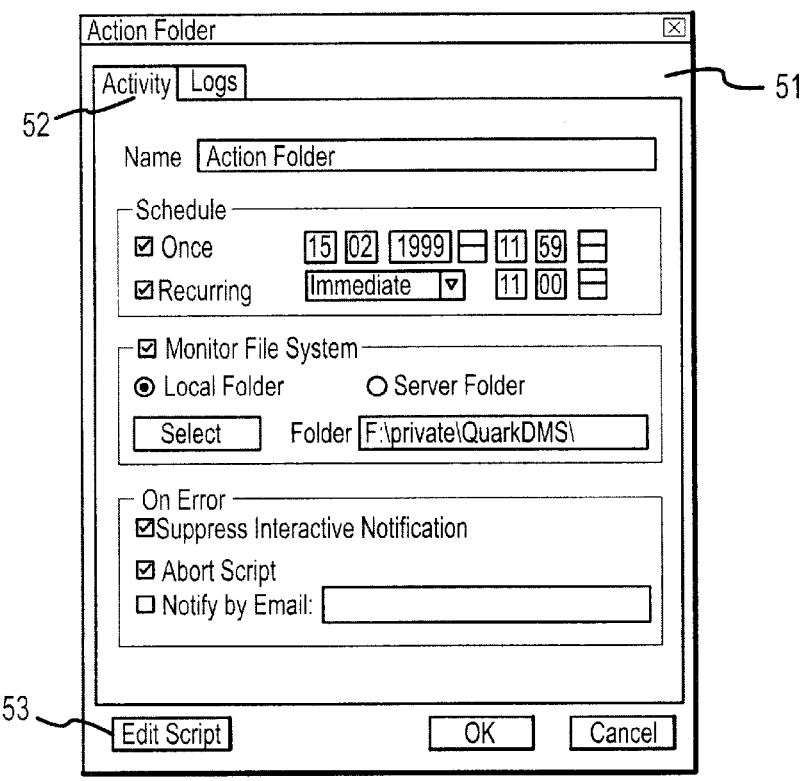
FIG. 17 is a screenshot of a dialog box for configuring an Action Folder under a preferred embodiment of the present invention.

An action folder 48 is created from the User View palette by selecting the Action Folder button 49, shown in FIG. 16. An Action Folder dialog box 51, shown in FIG. 17, is then displayed. An action folder is configured by selecting the Activity tab 52, and specifying a schedule for the running of the Action Folder's script. The schedule can designate that the activity operate only one at a specified time or to execute periodically at a specified periodic date and time, or both. The Action Folder can also be configured to execute the activity on any file contained within a specified folder on a local hard disk. The Monitor File System is selected and the folder to be monitored is specified. Then the activity will be executed on any file placed within the specified folder.

Defaults can also be specified in the event that an error is encountered during the execution of the activity. For example, the Action Folder can be configured so that the script is halted, by selecting the Abort Script option or an email is sent to a selected address by selecting the Notify by Email option.

Figure 18:
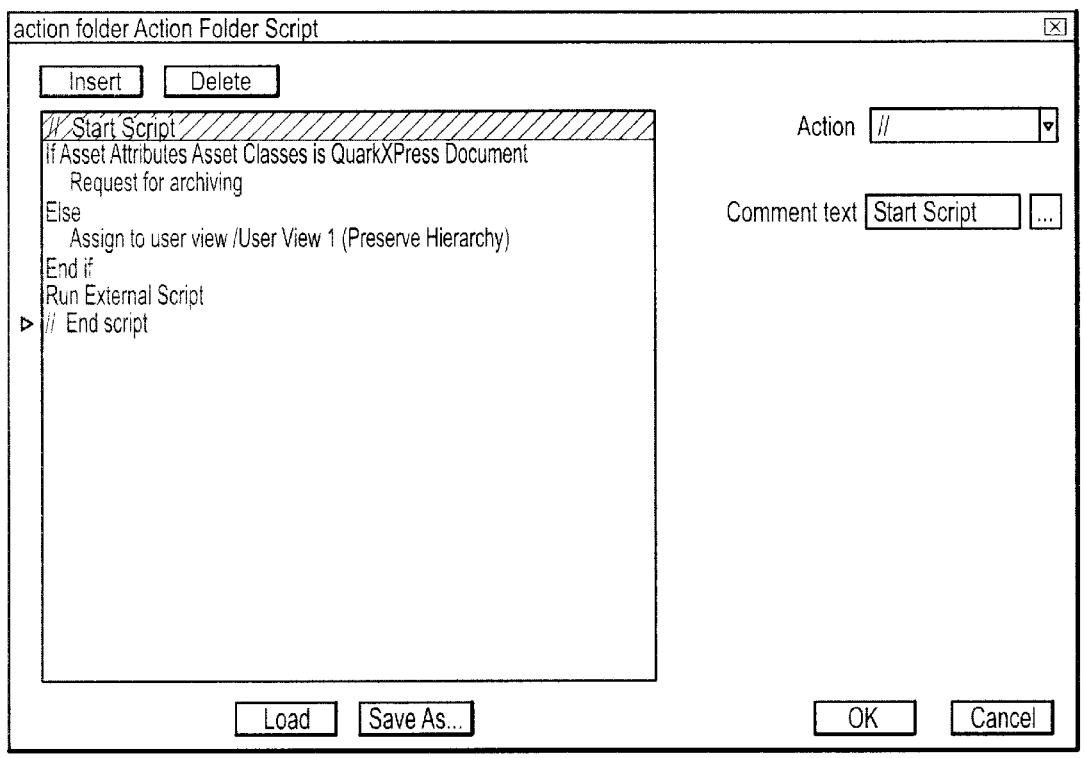
FIG. 18 is a screenshot of a dialog box for specifying the actions for an Action Folder under a preferred embodiment of the present invention.

The script that the Action Folder is to execute is configured by selecting the Edit Script button 52, as shown in FIG. 18. The script can be created or selected from a library. The script can be saved in an external file by selecting the Save As . . . button, or a script can be loaded from an external file by selecting Load. The script can be created or edited by clicking within the window in the dialog box.

Figure 19:
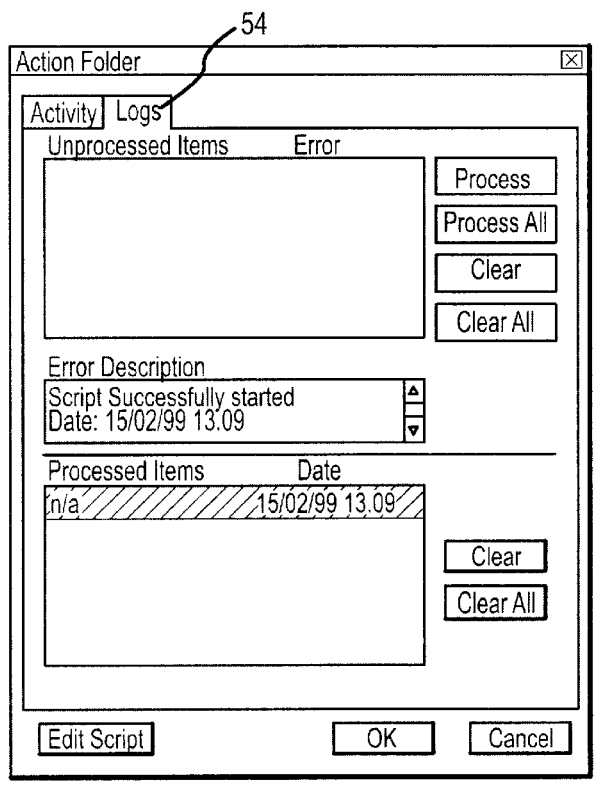
FIG. 19 is a screenshot of a dialog box for specifying the log of activities of an Action Folder under a preferred embodiment of the present invention.

The use of the Action Folders can be monitored by clicking the Logs tab 54. This provides a report of the processed activities and/or errors that occurred during the execution of the activities of the Action Folder, as shown in FIG. 19. These logs can be cleared or saved. Unprocessed items can be aborted or the error completed and the activity for that item processed.

The Action Folder's script can be applied to assets in two ways. The icons for the assets can be moved to the action folder's icon in the User View palette from the hard drive, from the queries palette, from the user view or form a different user view. The second way is to place the icons for the assets in the icon for the folder on the local hard disk that has been chosen for that Action Folder in the Activity panel 51 of the Action Folder dialog box.

Action Folder scripts are executed on an Execution Engine component, which may be located either on the Client or on the Server component. The location of the Execution Engine is restricted to the Client component if the script contains actions that can only be executed on the Client component. Actions correspond to individual instructions within a script. Some activities can be executed by the server application regardless of whether the client is operating while other activities require the client to be operating. In the latter instance, the system will query the user prior to quitting the client program as to run the script prior to quitting, cancel the quit or quit without ruining the script.

Because Action Folders scripts may be executed either on the Client and the Server component, there must be an Execution Engine on both sides. The server-side Execution Engine is multi-threaded, which means that multiple scripts can be executed at the same time. Client-side action handlers may use functionality of client side programs like QuarkXpress and XDialog user interface functionality. Error handling of Action Folders scripts is based on transactions: if any action determines that an unrecoverable error occurred it exits an exception which will be caught by the Execution Engine. The latter then aborts the transaction for this Action Folder run. After that, the Execution Engine continues to process the other assets/files. Such schema ensures a consistent state for any case. If the Execution Engine encounters a problem which will affect the whole batch of media assets, it stops its execution until the next scheduled execution. Failure and warnings are created by the action handlers themselves and are logged in the logging tables for Actions Folder execution.

Distributed Architecture

"Distributed architecture" is the term used to describe how the present invention can be deployed in more complex and distributed environments. The term Distributed should be seen from the viewpoint of globally distributed publishing companies. A major technical problem faced by these companies is the size of media assets which have to be stored and transported between several sites or locations.

Figure 7:
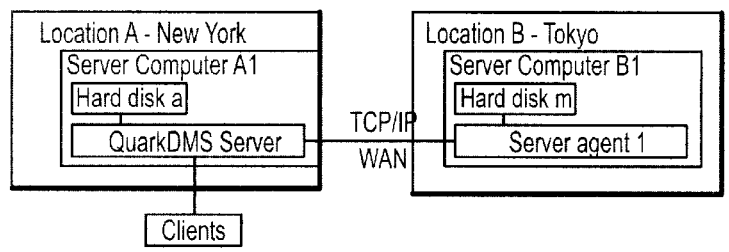
FIG. 7 is a schematic view of an example of the distributed architecture of a preferred embodiment of the present invention.
Figure 7:
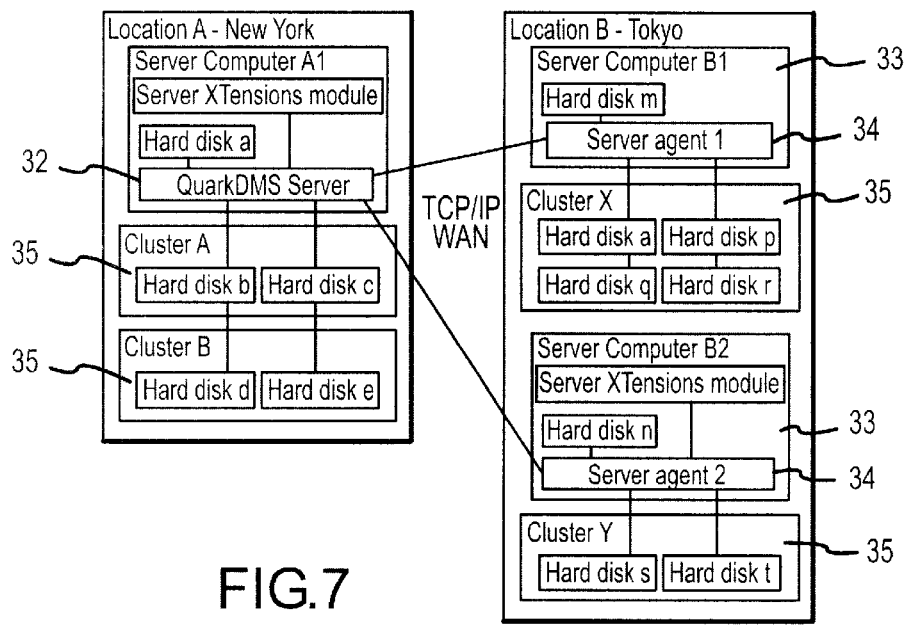

The present invention utilizes a distributed architecture to improve the performance and capabilities of the overall application. The invention includes several important features which are particularly useful for organizations with offices in different geographical locations. These offices typically need to pull assets from the same pool of shared digital assets. Often, each of these offices will have a local pool of digital resources as well which are not frequently shared with other offices. The preferred embodiment provides a "locations" feature which allows each of the offices to store some or all of its assets locally while those assets still remain under the control of the system. An example of the invention operating in several locations is illustrated in FIG. 7. The invention includes a server 32 on which the application is located, the database, the file servers, the client programs, and the separate locations 33. The server and the separate locations are connected by a TCP/IP based network. Other connections could be used as well.

Each location has at least one server or storage agent 34 operating on a computer that is physically distant from the server 32. The main server application on server 32 controls the operation of each of the server agents. The server agents are configured by the Administrator with the desired options to expand the capabilities of the main server application and each of the server agents.

Storage entities, which in the preferred embodiment are directories on a hard drive or other storage medium, are used by the Server to store assets. Each of the storage entities are either controlled by the individual server agents or by the main server 32. A single server agent is able to control multiple storage entities. One or more storage entities may be grouped and treated as a single logical unit, referred to as a "cluster" 35 under the control of either the main server application or a server agent. Each cluster 35 is assigned a unique name and associated to a particular location. The main server 32 application monitors the load and remaining space on each of the storage entities within each cluster 35 in order to store assets as efficiently as possible.

The main Server 32 application also utilizes storage rules to determine which assets are stored in particular clusters or even in individual storage entities which are not part of a cluster. The storage rules, which are configured by the Administrator, create and configure the storage entities and clusters, which may also be configured locally by the server agents.

In the example illustrated in FIG. 7, the main server, located in New York controls hard disk a and cluster A having hard disk b and hard disk c grouped together and cluster B which has hard disk d and hard disk e grouped together. The main server also controls the operation of server agent B1 which controls hard disk m and cluster X having hard disk o, hard disk p, hard disk q and hard disk r grouped together as a single unit, and the operation of server agent B2 which controls hard disk n and cluster Y having hard disk s and hard disk t. The Administrator can configure storage rules for the main server application and each of the server agents B1 and B2. These rules may, by way of example, cause assets originating in New York to be stored in hard disk a, cluster A or cluster B; assets created by users and group is in Tokyo to be stored in hard disk m, hard disk n, cluster X or cluster Y. Since assets typically will be used more often by the users who created them, the local storage improves the speed of access to those users. However, those assets still remain under the control of the main server application in New York and can be moved from one location to another at any time.

Figure 8:
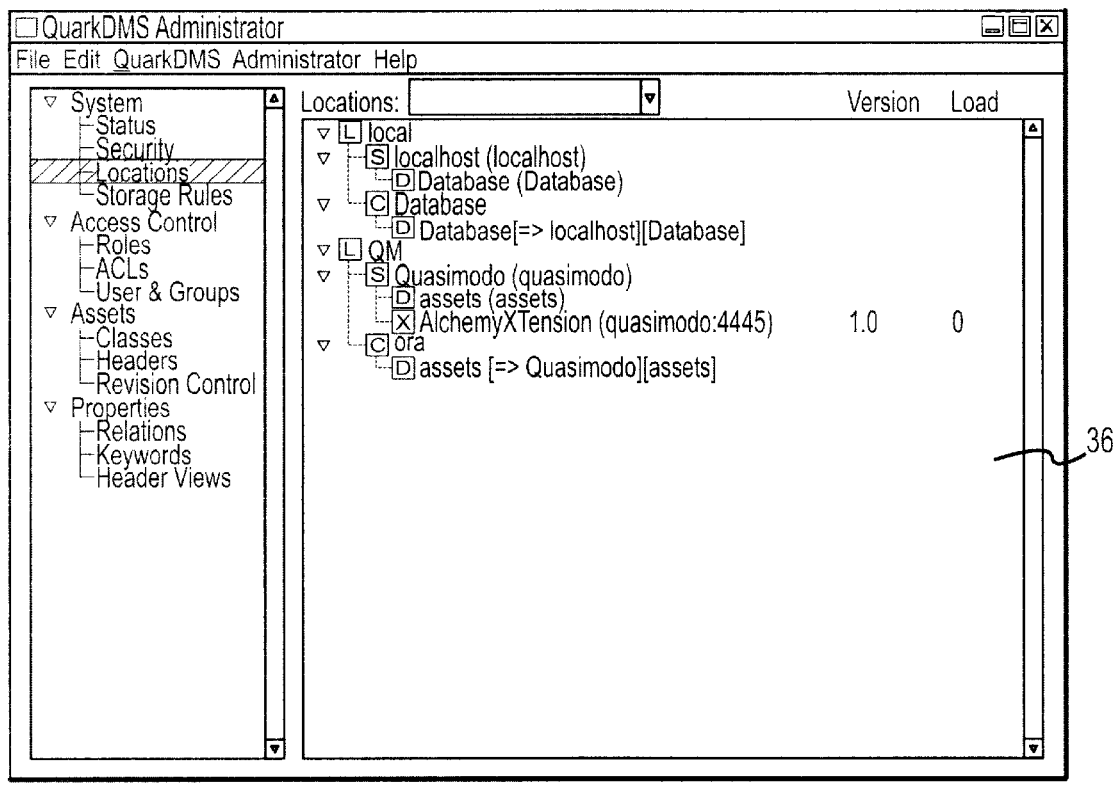
FIG. 8 is a screenshot of a dialog box for configuring the distributed architecture of a preferred embodiment of the present invention.

Users may use the Administrator to create and configure the locations feature in the invention. The Administrator displays a "Locations" dialog box 36, shown in FIG. 8, when the administrator desires to create and configure the server agents. A master location and the main Server application will always be specified. The administrator simply selects a blank part of the Locations scroll list and chooses New Location from the Edit menu to add a new location. Server agents, clusters and/or storage entities are added as desired to this new location by selecting from a menu. Thus, new locations can be easily configured from a remote site. The hardware and local applications are installed locally at each site. The configuration and options are performed through the main server application by the Administrator however.

The creation and configuration of the storage entities and clusters can be accomplished through the Administrator from any location. Clusters can be created by grouping the individual storage entities in a logical unit under the control of a server agent.

The use of the distributed architecture provides local storage of assets to improve the access of these assets to high usage users while still maintaining the control of those assets in the system itself. Also, the storage capacity and load usage can be balanced throughout the invention to optimize the performance of the invention.

Operation

The present invention, in a preferred embodiment, allows a user to check in assets, either on an individual basis, as a group of related assets, or even to deconstruct a document into individual assets for individual check in. The assets can be displayed in a hierarchical structure to show the relationships between the assets. Information about the assets is stored in the form of metadata in headers stored in the database while the assets are stored in a file server or clusters of file servers.

Digital assets can be retrieved from the storage servers by formulating queries. The queries set forth criteria that the system uses to search the headers in the database regarding the information relating to the stored assets. The invention displays the results of such a search in a Query Palette which allows the user to view and organize the results. The user can thus select among the list of assets which fall under the search criteria in order to check out desired assets.

The invention also provides User Views to group references or icons representing selected assets in order to organize the references to the assets without affecting the organization of the assets themselves. These grouping of references can be shared for collaborative projects. Another feature of the User Views is the use of Action Folders. This feature allows scripted actions to be applied to assets at scheduled times.

These and other features in the descriptive embodiment set forth above are considered within the inventions as claimed. The above descriptive embodiments were set forth for explanatory purposes and are not meant to unduly limit the claimed inventions. Other embodiments and variations of the inventive concept are considered to be within the claimed inventions.

Preferred Hardware/Software Embodiment

Next, preferred implementation details of the present invention are described. In the preferred embodiment described herein, the Database component shall be configured following two options: (1) a NT platform with a minimum of 96 MB free RAM, minimum processor speed: Pentium 166, supporting Windows NT 4.x/5.0 and the Oracle Database, or (2) a Unix Sun Sparc platform with a minimum of 96 MB free RAM, minimum processor speed: UltraSparc 140 Mhz, supporting Solaris 2.6 and Oracle Database.

The Server component shall be configured following two options: (1) Server NT platform with a minimum of 20 MB free RAM, minimum processor speed: Pentium 166, supporting Windows NT 4.0 Servicepack 3, SQL*Net 8.0.x, or (2) Server Unix Sun Sparc platform, with a minimum of 20 MB free RAM, minimum processor speed: UltraSparc 140 Mhz, supporting Solaris 2.6 and SQL*Net 8.0.x.

The Client component shall be configured following two options: (1) Windows Client running on Intel (Pentium) PC platform with a minimum of additional 4 MB free RAM, supporting Windows 95, NT 4.0 Servicepack 3, Windows 98 (QuarkXPress, Standalone, Administrator), or (2) Macintosh Client running on PowerMacintosh platform, with a minimum of additional 4 MB free RAM, and supporting Mac OS 8.x or 7.6.

The File Server component can run on whatever hardware platform (Unix, PCs or Mac) which allows mounting of file systems on MacOS, Windows, and Solaris—in case of a Unix server.

The above description of a preferred hardware/software embodiment of the present invention has been presented for the purposes of illustration and description only. It is not intended to be exhaustive or to limit the invention to the precise form disclosed. This invention is to be limited only by the following claims, which include all such embodiments when viewed in conjunction with the above specification and accompanying drawings.

What is claimed is:

1. A method for managing digital assets in a computer system, said method comprising the steps of:
   checking the digital asset into said computer system by:
      inputting information about individual digital assets into a searchable storage entity;
      inputting the individual digital asset into a storage entity;
   searching information on said searchable storage entity for digital assets meeting user-supplied criteria;
   displaying the results of such searches on a graphical display device;
   managing selected digital assets from said storage entity by selection from the results displayed on said graphical display device.

2. The method of claim 1 wherein said step of inputting information about individual assets into a searchable storage entity further includes the steps of:
   using the computer system to automatically gather information about the individual digital assets; and
   using the computer system to automatically input the information about the individual digital assets into said searchable storage entity.

3. The method of claim 1 wherein said step of inputting information about individual assets into a searchable storage entity further includes the steps of:
   requiring the user to input information about the individual digital assets into said searchable storage entity.

4. The method of claim 1 wherein said step of inputting information about individual digital assets into a searchable storage entity further includes:
   defining header fields in said searchable storage entity for the information about the individual digital assets; and
   inputting the information about the digital assets into said defined header fields.

5. The method of claim 1 wherein said step of inputting information about individual digital assets into a searchable storage entity further includes:
   defining sets of attributes for digital assets; and
   associating digital assets with the defined sets of attributes of which the digital assets possess.

6. The method of claim 1 wherein said step of inputting information about individual digital assets into a searchable storage entity further includes:
   establishing relationships between defined sets of attributes whereby each lower level named set of attributes includes the attributes defined for the next upper level set of attributes.

7. The method of claim 5 wherein said step of defining sets of attributes for digital assets includes:
   naming each defined set of attributes.

8. The method of claim 5 wherein said step of defining sets of attributes for digital assets includes:
   defining header fields for each of the attributes.

9. The method of claim 1 wherein said step of checking a digital asset into the computer system further includes:
   checking in a collection of digital assets by checking in the entire collection as a single digital asset.

10. The method of claim 9 wherein said step of checking in a collection of digital assets by checking in the entire collection as a single digital asset further includes:
    assigning a name to the entire collection as a group;
    checking in the group as a single digital asset under the assigned name.

11. The method of claim 9 wherein said step of checking in a collection of digital assets by checking in the entire collection as a single digital asset further includes:
    establishing relationships between individual assets of the collection of digital assets;
    maintaining the relationships between the individual assets of the collection as information in the searchable database.

12. The method of claim 9 wherein said step of checking in a collection of digital assets by checking in the entire collection as a single digital asset further includes:
    establishing relationships between selected individual assets of the collection of digital assets; and
    checking in groups of selected related individual assets as subgroups within the collection of digital assets.

13. The method of claim 1 wherein said step of checking in a digital asset into the computer system further includes:
   checking in a collection of digital assets by checking in each member of the collection as individual digital assets.

14. The method of claim 1 wherein said step of checking in a digital asset into the computer system further includes:
   checking in a collection of digital assets by checking in the entire collection of digital assets as a single digital asset; and
   checking in each member of the collection of digital assets as individual assets as well.

15. The method of claim 14 wherein said step of checking in a collection of digital assets by checking in the entire collection of digital assets further includes:
   establishing relationships between selected digital assets; and
   maintaining information about said relationships in said searchable storage entity.

16. The method of claim 14 wherein said step of checking in a collection of digital assets by checking in the entire collection of digital assets further includes:
   establishing relationships between selected digital assets: and checking in selected digital assets as subgroups as well.

17. The method of claim 1 wherein said step of displaying the results of such searches on a graphical display device includes the step of:
   displaying the results in a hierarchical format displaying the relationships between the digital assets meeting the user supplied criteria.

18. The method of claim 1 wherein said step of displaying the results of such searches on a graphical display device includes the step of:
   displaying the results in a reverse hierarchical format displaying the relationships between the digital assets meeting the user supplied criteria and the asset classes.

19. The method of claim 1 wherein said step of displaying the results of such searches on a graphical display device includes the step of:
   displaying the results of the searches grouped by information about the individual digital assets meeting the user supplied criteria.

20. The method of claim 1 wherein said step of displaying the results of such searches on a graphical display device includes the steps of:
   defining header fields for each digit asset;
   displaying said header fields of each digital asset meeting the user supplied criteria.

21. The method of claim 1 wherein said step of displaying the results of such searches on a graphical display device includes the step of:
   displaying the results of the searches in a user customized format.

22. The method of claim 1 wherein said step of displaying the results of such searches on a graphical display device includes the step of:
   displaying the results of the searches in a low-resolution thumbnail view format.

23. The method of claim 1 wherein said step of displaying the results of such searches on a graphical display device includes the step of:
   displaying information relating to revisions of each of the digital assets meeting the user supplied criteria.

24. The method of claim 1 wherein said step of displaying the results of such searches on a graphical display device includes the step of:
   displaying references to each of the digital assets meeting the user-supplied criteria; and
   organizing said references without affecting the organization of the digital assets stored in the storage entity.

25. The method of claim 1 wherein said step of checking out the digital asset from the computer system further includes:
   selecting the individual digital asset from the searchable storage entity to be checked out;
   copying the selected individual digital asset from the searchable storage entity into a local computer device.

26. The method of claim 1 wherein said method further comprises the steps of:
   configuring scripted actions to be executed on selected digital assets;
   associating said scripted actions with said selected digital assets; and
   monitoring processed activities and/or errors occurred during the execution of said scripted actions.

27. The method of claim 26 wherein said step of configuring scripted actions includes the steps of:
   scheduling the action for a specific time.

28. The method of claim 26 wherein said step of configuring scripted actions includes the steps of:
   scheduling the action for periodic action at recurring times.

29. The method of claim 26 wherein said step of associating said scripted actions with said selected digital assets includes:
   creating a folder on said computer system;
   associating said scripted action with the contents of said folder; and
   designating references to said selected digital assets as the contents of said folder so that said scripted actions are executed on the digital assets relating to said references in said folder.

30. The method of claim 26 wherein said step of monitoring processed activities and/or errors occurred during the execution of said scripted actions includes the steps of:
   inputting information about said processed activities and/or errors in the searchable storage entity; and
   displaying information about said processed activities and/or errors on a graphical display device.

31. The method of claim 1 wherein said method further includes the steps of:
   defining a set of storage rules for the management of the digital assets in the computer system;
   configuring a main server application at a central location to manage the digital assets throughout the system;
   configuring at least one server agent at a second location for storing digital assets at a local storage entity; and
   operating said main server application in accordance with said defined set of storage rules to manage the digital assets in the computer system so that the load and usage of the digital assets is balanced throughout the system.

32. The method of claim 31 wherein the step of defining a set of storage rules includes:
   storing digital assets at the location of highest usage.

33. The method of claim 31 wherein said method further includes the steps of:
   providing client applications for checking, searching and retrieval of the digital assets.

34. The method of claim 33 wherein said client applications include:
   providing an administrator component for configuring the computer system for use.

35. The method of claim 33 wherein said client applications include:
   providing a stand-alone client for checking digital assets into and out of the system and for searching for digital assets without a host application.

36. The method of claim 33 wherein said client applications include:
   providing a host application for checking digital assets into and out of the system and for searching for digital assets.

37. A method of managing distributed assets on a computer system having a central location and at least one other location; said method comprising the steps of:
   configuring a main application at said central location to manage the digital assets for storage, searches and retrieval throughout the system;
   configuring an agent application at each of the other locations for managing the storage of digital assets in local storage entities;
   defining a set of storage rules for the storage of digital assets in the system; and
   operating said main application in accordance with said defined set of storage rules to balance the storage of the digital assets throughout the system.

38. The method of claim 37 wherein said step of defining a set of storage rules includes the step of:
   defining the storage rules so that digital assets are stored in the location of highest usage.

39. The method of claim 37 wherein said step of configuring an agent application includes the step of:
   configuring one or more storage entities as a single logical storage entity.

40. The method of claim 37 wherein said method further comprises the steps of:
   configuring a searchable storage unit at said central location;
   storing information about each of the individual digital assets regardless of location in said searchable storage unit;
   searching for digital assets stored in said system by searching said searchable storage unit for information about the digital assets based on user-supplied criteria;
   selecting digital assets for retrieval based on the results of the searches in said searchable storage unit based on user-supplied criteria; and
   retrieving the selected digital assets from the storage entity in which the selected digital assets are stored.

41. A method for managing digital assets in a computer system, the method comprising the steps of:
   defining sets of attributes for digital assets;
   associating digital assets with said defined sets of attributes which possess the attributes of the digital assets;
   storing information about the digital assets including said defined sets of attributes to which said digital assets have been associated with in a searchable database; and
   searching for selected digital assets by searching said stored information based on user supplied criteria.

42. The method of claim 41 wherein said step of defining sets of attributes includes:
   naming each defined set of attributes.

43. The method of claim 41 wherein said step of defining sets of attributes for digital assets includes:
   defining header fields for each of the attributes.

44. The method of claim 41 wherein said step of defining sets of attributes for digital assets includes:
   establishing hierarchical relationships between defined sets of attributes whereby each lower level named set of attributes includes the attributes defined for the next upper level set of attributes.

45. The method of claim 44 wherein said step of associating digital assets with said defined sets of attributes includes the step of:
   associating a defined set of attributes with digital assets at more than one location in said hierarchical relationship.

46. The method of claim 41 wherein said step of defining sets of attributes includes the step of:
   defining said sets of attributes by using system defined sets of attributes.

47. The method of claim 41 wherein said step of defining sets of attributes includes the step of:
   defining said sets of attributes by using user-defined sets of attributes.

48. A method for managing digital assets stored in a computer system wherein said method comprises the steps of:
   storing digital assets into a storage entity controlled by said computer system by checking the digital assets into the computer system;
   checking the digital assets into the computer system by storing information about the digital assets in a searchable storage entity;
   checking individual digital assets into the system;
   checking in collections of digital assets; and
   storing each of the digital assets into the storage entity.

49. The method of claim 48 wherein said step of checking the digital assets into the computer system includes the step of:
   checking in a collection of digital assets by checking in the entire collection as a single digital asset.

50. The method of claim 49 wherein said step of checking in a collection of digital assets by checking in the entire collection as a single digital asset further includes:
   assigning a name to the entire collection as a group;
   checking in the group as a single digital asset under the assigned name.

51. The method of claim 49 wherein said step of checking in a collection of digital assets by checking in the entire collection as a single digital asset further includes:
   establishing relationships between individual assets of the collection of digital assets;
   maintaining the relationships between the individual assets of the collection as information in the searchable database.

52. The method of claim 49 wherein said step of checking in a collection of digital assets by checking in the entire collection as a single digital asset further includes:
   establishing relationships between selected individual assets of the collection of digital assets; and
   checking in groups of selected related individual assets as subgroups within the collection of digital assets.

53. The method of claim 48 wherein said step of checking in a digital asset into the computer system further includes:
   checking in a collection of digital assets by checking in each member of the collection as individual digital assets.

54. The method of claim 48 wherein said step of checking in a digital asset into the computer system further includes:

checking in a collection of digital assets by checking in the entire collection of digital assets as a single digital asset; and checking in each member of the collection of digital assets as individual assets as well.

55. The method of claim 54 wherein said step of checking in a collection of digital assets by checking in the entire collection of digital assets further includes:

establishing relationships between selected digital assets; and maintaining information about said relationships in said searchable storage entity.

56. The method of claim 54 wherein said step of checking in a collection of digital assets by checking in the entire collection of digital assets further includes:

establishing relationships between selected digital assets; and checking in selected digital assets as subgroups as well.

57. The method of claim 48 wherein said method further includes a step of checking out digital assets from the computer system; said step of checking out digital assets includes:

selecting the individual digital asset from the searchable storage entity to be checked out;

copying the selected individual digital asset from the searchable storage entity into a local computer device.

58. A system for managing digital assets, said system comprising:

means for storing digital assets in their original format;

means for checking digital assets into said means for storing digital assets;

said means for checking digital assets into said means for storing digital assets includes:

a searchable database;

means for inputting information about individual digital assets into said searchable database;

means for retrieving the stored digital assets from the means for storing digital assets based on the information stored about the stored digital assets in said database; and means for checking out the digital assets from said means for storing digital assets;

said means for checking out digital assets from said means for storing digital assets includes:

a searchable database;

a local computer device; and means for loading individual digital assets from the searchable database into said local computer device.

59. The system of claim 58 wherein said means for storing digital assets includes:

one or more storage entities.

60. The system of claim 58 wherein said means for storing digital assets includes:

said searchable database.

61. The system of claim 58 wherein said means for inputting information includes:

header fields in said database for storing said information.

62. The system of claim 58 wherein said means for storing information includes:

means for defining header fields in said database for receiving said information.

63. The system of claim 62 wherein said means for defining said header fields includes:

system definable header fields.

64. The system of claim 62 wherein said means for defining said header fields includes:

user-definable header fields.

65. The system of claim 58 wherein said means for inputting said information includes:

means for said system to automatically gather information about the digital asset.

66. The system of claim 65 wherein said means for said system to automatically gather information includes:

means for said system to gather file specific information about the digital asset.

67. The system of claim 58 wherein said means for inputting said information includes:

means for a user to input information about the digital asset.

68. The system of claim 58 whereby said means for retrieving stored digital assets includes:

means for searching the information in said database based on user supplied criteria;

means for graphically displaying references to digital assets stored in said system having information stored in said database which match the user supplied criteria; and means for retrieving digital assets from storage based on the selection of references displayed on said means for graphically displaying references.

69. The method of claim 58 wherein said means for checking out the digital asset from said means for storing digital assets includes:

means for selecting the individual digital asset from the searchable storage entity to be checked out;

means for copying the selected individual digital asset from the searchable storage entity into a local computer device.

70. A system for managing digital assets, said system having means for storing digital assets and a database for storing information about the stored digital assets; said system comprising:

means for defining sets of attributes for digital assets; and means for associating digital assets with defined sets of attributes which possess the attributes of the digital asset;

means for storing information about said defined sets of attributes associated with a digital asset in said database; and means for searching for selected digital assets by searching said stored information about said defined sets of attributes in said database.

71. The system of claim 70 wherein said means for defining sets of attributes includes:

establishing hierarchical relations between defined sets of attributes whereby each lower level named set of attributes includes the attributes defined for the next upper level set of attributes.

72. The system of claim 70 wherein said means for defining sets of attributes includes:

means for naming each defined set of attributes.

73. The system of claim 70 wherein said means for defining sets of attributes for digital assets includes:

means for defining header fields for each of the attributes.

74. The system of claim 70 wherein said means for defining sets of attributes for digital assets includes:

means for establishing hierarchical relationships between defined sets of attributes whereby each lower level named set of attributes includes the attributes defined for the next upper level set of attributes.

75. The system of claim 70 wherein said means for associating digital assets with said defined sets of attributes includes:
means for associating a defined set of attributes with digital assets at more than one location in said hierarchical relationship.

76. The system of claim 70 wherein said means for defining sets of attributes includes:
means for defining said sets of attributes by using system defined sets of attributes.

77. The system of claim 70 wherein said means for defining sets of attributes includes:
means for defining said sets of attributes by using user-defined steps of attributes.

78. A computer system for managing digital assets, wherein said system comprising:
a searchable database;
a local computer device;
means for checking the digital asset s into the computer system by storing information about the digital assets in a said searchable database;
said means for checking the digital assets Into the computer system includes:
means for checking in individual digital assets into the system;
means for checking in collections of digital assets;
means for storing the digital assets into a storage entity controlled by said computer system;
means for searching for digital assets by searching the information about the digital assets in said searchable database;
means for managing said stored digital assets based on the results of searched performed by said means for searching for digital assets.

79. The system of claim 78 wherein said means for checking in collections of digital assets into the computer system includes:
means for checking in a collection of digital assets by checking in the entire collection as a single digital asset.

80. The system of claim 79 wherein said means for checking in a collection of digital assets by checking in the entire collection as a single digital asset further includes:
means for assigning a name to the entire collection as a group; and
means for checking in the group as a single digital asset under the assigned name.

81. The system of claim 79, wherein said means for checking in a collection of digital assets by checking in the entire collection as a single digital asset further includes:
means for establishing relationships between individual assets of the collection of digital assets; and
means for maintaining the relationships between the individual assets of the collection as information in the searchable database.

82. The system of claim 79 wherein said means for checking in a collection of digital assets by checking in the entire collection as a single digital asset further includes:
means for establishing relationships between selected individual assets of the collection of digital assets; and
means for checking in groups of selected related individual assets as subgroups within the collection of digital assets.

83. The system of claim 78 wherein said means for checking in a digital asset into the computer system further includes:
means for checking in a collection of digital assets by checking in each member of the collection as individual digital assets.

84. The system of claim 78 wherein said means for checking in a digital asset into the computer system further includes:
means for checking in a collection of digital assets by checking in the entire collection of digital assets as a single digital asset; and
means for checking in each member of the collection of digital assets as individual assets as well.

85. The system of claim 78 wherein said means for checking in a collection of digital assets by checking in the entire collection of digital assets further includes:
means for establishing relationships between selected digital assets; and
means for maintaining information about said relationships in said searchable storage entity.

86. The system of claim 78 wherein said means for checking in a collection of digital assets by checking in the entire collection of digital assets further includes:
means for establishing relationships between selected digital assets; and
means for checking in selected digital assets as subgroups as well.

87. The system of claim 78 wherein said means for managing the digital assets further includes:
means for selecting the individual digital asset from the searchable storage entity to be checked out;
means for copying the selected individual digital asset from the searchable storage entity into a local computer device.

88. A system for managing digital assets stored in a computer system, the system comprising:
means for creating references to digital assets stored in the computer system;
means for graphically displaying said references to selected digital assets stored in the computer system;
means for organizing the display of said references on said graphic display in a user customizable format without affecting the organization of the digital assets relating to said references stored in the computer system; and
means for retrieving the selected digital assets stored in the computer system by selecting the references relating to said selected digital assets from said display of references.

89. The system of claim 88 wherein said means for organizing the display of said references includes the step of:
means for storing said references to selected digital assets in said computer system.

90. The system of claim 88 wherein said means for organizing the display of said references includes:
means for sharing said references displayed with other users of said computer system.

91. A system for managing distributed assets on a computer system having a central location and at least one other location; said system comprising:
means for configuring a main application at said central location to manage the digital assets for storage, searches and retrieval throughout the system;

means for configuring an agent application at each of the other locations for managing the storage of digital assets in local storage entities;

a set of storage rules for managing the storage of digital assets throughout the system;

means for defining said set of storage rules for the storage of digital assets in the system; and means for operating said main application in accordance with said defined set of storage rules to balance the storage of the digital assets throughout the system.

92. The system of claim 91 wherein said means for defining said set of storage rules includes:

means for defining the storage rules so that digital assets are stored in the location of highest usage.

93. The system of claim 91 wherein said means for configuring an agent application includes:

means for configuring one or more storage entities as a single logical storage entity.

94. The system of claim 91 wherein said system further comprises:

means for configuring a searchable storage unit at said central location;

means for storing information about each of the individual digital assets regardless of location in said searchable storage unit;

means for searching for digital assets stored in said system by searching said searchable storage unit for information about the digital assets based on user-supplied criteria;

means for selecting digital assets for retrieval based on the results of the searches in said searchable storage unit based on user-supplied criteria; and means for retrieving the selected digital assets from the storage entity in which the selected digital assets are stored.

\* \* \* \* \*